US011815615B2

(12) United States Patent
Gulati et al.

(10) Patent No.: US 11,815,615 B2
(45) Date of Patent: Nov. 14, 2023

(54) COOPERATIVE RADAR SENSING IN WIRELESS COMMUNICATIONS

(71) Applicant: QUALCOMM Incorporated, San Diego, CA (US)

(72) Inventors: Kapil Gulati, Belle Mead, NJ (US); Dan Zhang, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/202,177

(22) Filed: Mar. 15, 2021

(65) Prior Publication Data

US 2022/0291327 A1 Sep. 15, 2022

(51) Int. Cl.
*H04W 24/10* (2009.01)
*G01S 5/02* (2010.01)
*H04W 76/15* (2018.01)
*H04W 76/14* (2018.01)
*G01S 7/42* (2006.01)

(52) U.S. Cl.
CPC ........ *G01S 5/02529* (2020.05); *G01S 5/0284* (2013.01); *G01S 7/42* (2013.01); *H04W 24/10* (2013.01); *H04W 76/14* (2018.02); *H04W 76/15* (2018.02)

(58) Field of Classification Search
CPC ...... G01S 5/02529; G01S 5/0284; G01S 7/42; G01S 2013/9316; G01S 7/003; G01S 13/87; G01S 7/006; H04W 24/10; H04W 76/14; H04W 76/15
See application file for complete search history.

(56) References Cited

U.S. PATENT DOCUMENTS

| 2016/0187466 | A1* | 6/2016 | Kim ...................... G01S 13/931 342/59 |
| 2016/0349365 | A1 | 12/2016 | Ling |
| 2018/0170400 | A1 | 6/2018 | Mahnke et al. |
| 2019/0369233 | A1* | 12/2019 | Niesen ................... H04W 4/46 |
| 2021/0109881 | A1* | 4/2021 | Moustafa ............ G06F 13/4282 |

OTHER PUBLICATIONS

International Search Report and Written Opinion—PCT/US2022/070657—ISA/EPO—dated May 25, 2022.

* cited by examiner

*Primary Examiner* — Chuong A Ngo
(74) *Attorney, Agent, or Firm* — Holland & Hart LLP/QUALCOMM Incorporated

(57) ABSTRACT

Methods, systems, and devices for cooperative radar sensing in wireless communications are described. A user equipment (UE) may measure one or more radar measurement parameters associated with a radar target, the radar measurement parameters including a set of values and a first time stamp corresponding to the measurement. The UE may receive a report, from a second UE, including a second set of values for the one or more radar measurement parameters associated with the radar target, an identifier associated with the second UE, and a second time stamp corresponding to the second set of values. The UE may generate a combined set of values based on the measured set of values, the second set of values, and the first and second time stamps. The UE may transmit a report to one or more other UEs including the combined set of values.

47 Claims, 13 Drawing Sheets

COOPERATIVE RADAR SENSING IN WIRELESS COMMUNICATIONS

INTRODUCTION

The following relates to wireless communications, and more specifically to managing radar sensing in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first user equipment (UE) is described. The method may include measuring a first set of values for one or more radar measurement parameters associated with a radar target. In some examples, the first set of values may include at least a first time value associated with the first set of values. The method may further include transmitting a first report including the first set of values for the one or more radar measurement parameters associated with the radar target, an indication of the first time value associated with the first set of values, a first identifier associated with the radar target, and a second identifier associated with the first UE.

An apparatus for wireless communication at a first UE is described. The apparatus may include a processor, memory coupled to the processor, the processor and memory configured to measure a first set of values for one or more radar measurement parameters associated with a radar target. In some examples, the first set of values may include at least a first time value associated with the first set of values. The processor and memory may further be configured to transmit a first report including the first set of values for the one or more radar measurement parameters associated with the radar target, an indication of the first time value associated with the first set of values, a first identifier associated with the radar target, and a second identifier associated with the first UE.

Another apparatus for wireless communication at a first UE is described. The apparatus may include means for measuring a first set of values for one or more radar measurement parameters associated with a radar target. In some examples, the first set of values may include at least a first time value associated with the first set of values. The apparatus may further include means for transmitting a first report including the first set of values for the one or more radar measurement parameters associated with the radar target, an indication of the first time value associated with the first set of values, a first identifier associated with the radar target, and a second identifier associated with the first UE.

A non-transitory computer-readable medium storing code for wireless communication at a first UE is described. The code may include instructions executable by a processor to measure a first set of values for one or more radar measurement parameters associated with a radar target. In some examples, the first set of values may include at least a first time value associated with the first set of values. The code may further include instructions executable by a processor to transmit a first report including the first set of values for the one or more radar measurement parameters associated with the radar target, an indication of the first time value associated with the first set of values, a first identifier associated with the radar target, and a second identifier associated with the first UE.

Some examples of the method, apparatuses, and non-transitory computer-readable medium described herein may further include operations, features, means, or instructions for receiving, from a second UE, a second report including a second set of values for the one or more radar measurement parameters associated with the radar target, a third identifier associated with the second UE, and an indication of a second time value and generating a combined set of values for the one or more radar measurement parameters by combining the first set of values and the second set of values.

Some examples of the method, apparatuses, and non-transitory computer-readable medium described herein may further include operations, features, means, or instructions for transmitting the combined set of values for the one or more radar measurement parameters including the first set of values, the indication of the first time value associated with the first set of values, the second set of values, an indication of the second time value associated with the second set of values, the first identifier associated with the radar target, the second identifier associated with the first UE, and the third identifier associated with the second UE.

Some examples of the method, apparatuses, and non-transitory computer-readable medium described herein may further include operations, features, means, or instructions for receiving, from a second UE, a second report including a second set of values for the one or more radar measurement parameters associated with the radar target, a third identifier associated with the second UE, and an indication of a second time value, receiving, from the second UE, a third report including a third set of values for the one or more radar measurement parameters associated with the radar target, the third identifier associated with the second UE, and an indication of a third time value, determining that the second time value may be earlier than the third time value, and generating, based on determining that the second time value may be earlier than the third time value, a combined set of values for the one or more radar measurement parameters by combining the first set of values and the third set of values.

Some examples of the method, apparatuses, and non-transitory computer-readable medium described herein may further include operations, features, means, or instructions for measuring a second set of values for the one or more radar measurement parameters associated with the radar target and a second time value, where the first time value may be earlier than the second time value and generating a second report including the second set of values for the one or more radar measurement parameters associated with the radar target, an indication of the second time value associated with the second set of values, the first identifier associated with the radar target, and the second identifier associated with the first UE.

Some examples of the method, apparatuses, and non-transitory computer-readable medium described herein may further include operations, features, means, or instructions for transmitting the second report including the second set of values for the one or more radar measurement parameters associated with the radar target, the indication of the second time value associated with the second set of values, the first identifier associated with the radar target, and the second identifier associated with the first UE.

Some examples of the method, apparatuses, and non-transitory computer-readable medium described herein may further include operations, features, means, or instructions for identifying a reference frame associated with the radar target, where the first set of values for the one or more radar measurement parameters may be based on the reference frame.

Some examples of the method, apparatuses, and non-transitory computer-readable medium described herein may further include operations, features, means, or instructions for identifying a first position associated with the radar target relative to a second position associated with the first UE and generating the first report including the first set of values for the one or more radar measurement parameters associated with the radar target, the first position associated with the radar target, the second position associated with the first UE, the indication of the first time value associated with the first set of values, the first identifier associated with the radar target, and the second identifier associated with the first UE.

Some examples of the method, apparatuses, and non-transitory computer-readable medium described herein may further include operations, features, means, or instructions for identifying a first velocity associated with the radar target relative to a second velocity associated with the first UE and generating the first report including the first set of values for the one or more radar measurement parameters associated with the radar target, the first velocity associated with the radar target, the second velocity associated with the first UE, the indication of the first time value associated with the first set of values, the first identifier associated with the radar target, and the second identifier associated with the first UE.

Some examples of the method, apparatuses, and non-transitory computer-readable medium described herein may further include operations, features, means, or instructions for measuring a second set of values for the one or more radar measurement parameters associated with a second radar target and a second time value and generating a second report including the first set of values for the one or more radar measurement parameters associated with the radar target, the indication of the first time value associated with the first set of values, the second set of values for the one or more radar measurement parameters associated with the second radar target, an indication of the second time value associated with the second set of values, the first identifier associated with the radar target, the second identifier associated with the first UE, and a third identifier associated with the second radar target.

Some examples of the method, apparatuses, and non-transitory computer-readable medium described herein may further include operations, features, means, or instructions for storing an indication of the radar target and the second radar target based on determining the second set of values.

Some examples of the method, apparatuses, and non-transitory computer-readable medium described herein may further include operations, features, means, or instructions for receiving, from a base station, an allocation of resources for the first UE to use to transmit the first report, where the resources include periodic sidelink resources, aperiodic sidelink resources, or both, for transmitting the first report.

Some examples of the method, apparatuses, and non-transitory computer-readable medium described herein may further include operations, features, means, or instructions for transmitting a unicast sidelink message including the first report or a broadcast sidelink message including the first report.

In some examples of the method, apparatuses, and non-transitory computer-readable medium described herein, the one or more radar measurement parameters include at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

A method for wireless communication at a first UE is described. The method may include receiving, from a second UE, a second set of values for the one or more radar measurement parameters associated with a radar target, a third identifier associated with the second UE and an indication of a second time value. The method may further include transmitting a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

An apparatus for wireless communication at a first UE is described. The apparatus may include a processor, memory coupled to the processor, the processor and memory configured to receive, from a second UE, a second set of values for the one or more radar measurement parameters associated with a radar target, a third identifier associated with the second UE and an indication of a second time value. The processor and memory may further be configured to transmit a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

Another apparatus for wireless communication at a first UE is described. The apparatus may include means for receiving, from a second UE, a second set of values for the one or more radar measurement parameters associated with a radar target, a third identifier associated with the second UE and an indication of a second time value. The apparatus may further include means for transmitting a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

A non-transitory computer-readable medium storing code for wireless communication at a first UE is described. The code may include instructions executable by a processor to receive, from a second UE, a second set of values for the one or more radar measurement parameters associated with a radar target, a third identifier associated with the second UE and an indication of a second time value. The code may further include instructions executable by a processor to transmit a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

Some examples of the method, apparatuses, and non-transitory computer-readable medium described herein may further include operations, features, means, or instructions for determining a combined set of values for the one or more radar measurement parameters by combining the first set of values and the second set of values and generating the first report including the combined set of values, the indication of the first time value associated with the first set of values, the indication of the second time value associated with the second set of values, the first identifier associated with the radar target, the second identifier associated with the first UE, and the third identifier associated with the second UE.

Some examples of the method, apparatuses, and non-transitory computer-readable medium described herein may further include operations, features, means, or instructions for receiving, from the second UE, a third set of values for the one or more radar measurement parameters associated with the radar target, the third identifier associated with the second UE, and an indication of a third time value, determining that the second time value may be earlier than the third time value, and generating, based on determining that the second time value may be earlier than the third time value, a combined set of values for the one or more radar measurement parameters by combining the first set of values and the third set of values.

Some examples of the method, apparatuses, and non-transitory computer-readable medium described herein may further include operations, features, means, or instructions for determining, at the first UE, a third set of values for the one or more radar measurement parameters associated with the radar target and a third time value, where the first time value may be earlier than the third time value and generating a second report including the third set of values for the one or more radar measurement parameters associated with the radar target, an indication of the third time value associated with the third set of values, the second set of values for the one or more radar measurement parameters associated with the radar target, the indication of the second time value associated with the second set of values, the first identifier associated with the radar target, the second identifier associated with the first UE, and the third identifier associated with the second UE.

Some examples of the method, apparatuses, and non-transitory computer-readable medium described herein may further include operations, features, means, or instructions for transmitting a unicast sidelink message including the first report or a broadcast sidelink message including the first report.

In some examples of the method, apparatuses, and non-transitory computer-readable medium described herein, the one or more radar measurement parameters include at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

DETAILED DESCRIPTION

Figure 1:
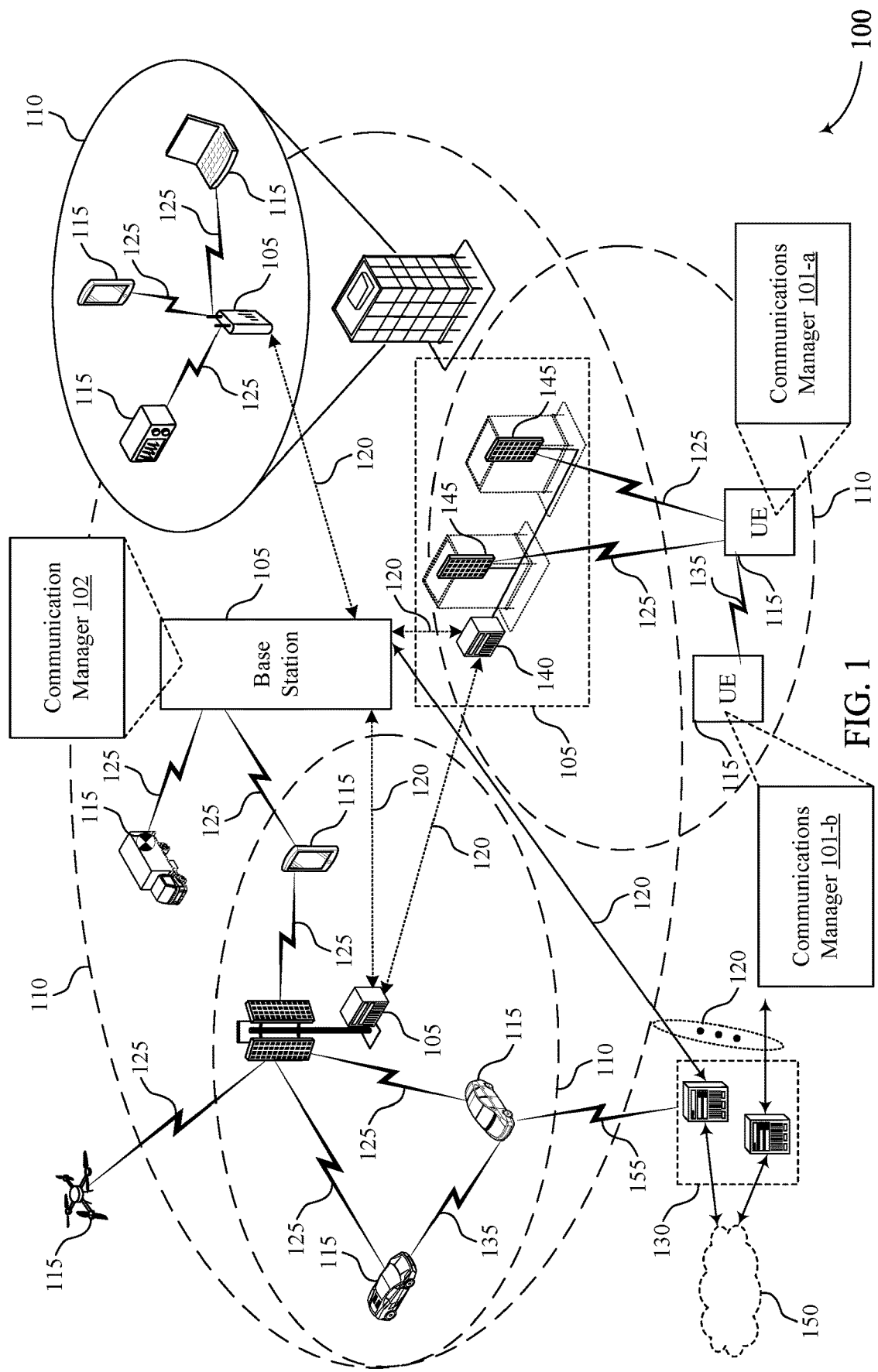
FIG. 1 illustrates an example of a wireless communications system that supports cooperative radar sensing in wireless communications in accordance with one or more aspects of the present disclosure.

Wireless communications systems (e.g., vehicle-to-everything (V2X) systems) may support radar sensing procedures. A UE (e.g., a vehicle equipped with one or more radar transmitters) may transmit radar measurement signals in one or more directions, and may identify surrounding radar targets (e.g., objects such as other UEs (e.g., other vehicles), pedestrians, obstructions, buildings, or the like). For example, a UE may transmit a radar waveform in a direction of a radar target. Upon receiving a reflection of the radar waveform, the UE may identify one or more physical attributes of the radar target. That is, the reflection of the radar waveform may indicate the physical attributes of the radar target. Specifically, the UE may determine values for one or more radar measurement parameters (e.g., location, velocity, dimensions, orientation, and uncertainty values for each value) for the radar target. However, radar sensing may be subject to physical blockages, blind spots, detection range, and interference from other radar signals. As a result, a UE may falsely detect an object or fail to detect an object at all, resulting failed radar detection procedures, slower traffic, and increased risk of accident.

In some wireless communications systems, devices may use cooperative radar sensing with knowledge dissemination. For example, a UE may use a radar to identify parameter values related to a radar target. That is, the UE may measure values (e.g., tuples) for a target location, a target velocity, target dimensions, target orientation, and an uncertainty associated with a radar target. Upon measuring the values, the UE may broadcast a message to other UEs. In some examples, the broadcasted message may include multiple items, where each item includes a radar target and an identifier of a corresponding radar used to measure the radar target. For example, an item may include parameters (e.g., location, velocity, dimensions, orientation, etc.) for the a target as well as a radar identifier of the radar used to determine the parameters.

According to one or more aspects, a first UE may measure a set of values for radar parameters (e.g., parameter associated with a radar target) and transmits a radar measurement report (a sidelink message) including the set of values (e.g., tuples) for a radar target. The report may further include a time stamp, an identifier of the radar and an identifier of the first UE. In some examples, the first UE may receive a measurement of radar parameters for the radar target from a second UE. In such examples, the first UE may transmit a radar measurement report (a sidelink message) including a set of parameter values (e.g., tuples) for the radar target (including the values measured by the first UE and the values reported by the second UE), a first time stamp for when the values were measured by the first UE, a second time stamp for when the values were measured by the second UE, an identifier of the radar, an identifier of the first UE and an identifier of the second UE. A third UE may receive the radar measurement report. In some examples, the third UE may modify at least one parameter indicated in the radar measurement report. For example, the third UE may update one or more parameter values for a radar target (e.g., replace older parameter values with recently calculated parameter values), resulting in an updated radar measurement report. The third UE may then broadcast the updated radar measurement report. Thus, sharing a comprehensive list of target information may allow UEs to share statistically independent knowledge from other UEs while preventing false confidence enhancement, thereby increasing communal knowledge of the proximal environment.

UEs supporting wireless communications may utilize the techniques described herein to experience power savings and extended battery life while ensuring reliable communications. Particular aspects of the subject matter described in this disclosure may be implemented to support techniques for cooperative radar sensing, among other examples in wireless communications systems, may support improvements in target determination, power consumption, resource usage, coverage enhancements, spectral efficiency, higher data rates.

Aspects of the disclosure are initially described in the context of wireless communications systems. Aspects of the disclosure are further illustrated by and described with reference to process flows, apparatus diagrams, system diagrams, and flowcharts that relate to cooperative radar sensing in wireless communications.

FIG. 1 illustrates an example of a wireless communications system 100 that supports cooperative radar sensing in wireless communications in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies. UEs 115 may wirelessly communicate via one or more communication links 135. In some examples, communication link 135 may be a sidelink communication link.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands. In some cases, the frequency bands may be in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI- RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to one or more aspects of the present disclosure, a UE 115 may use radar to identify one or more parameter values related to a radar target at a particular timestamp. That is, the UE 115 may use communications manager 101-*a* to measure a set of values for one or more parameters associated with a radar target. The set of values may include target location, target velocity, target dimensions, target orientation, and respective uncertainty values for each parameter value, etc. The UE 115 may broadcast a message to other UEs 115. The broadcasted message may include one or more items, where each item includes one target (e.g., target values) and one corresponding radar (e.g., radar identifier of the radar used to determine the parameters associated with the target). Each item may further include uncertainties corresponding to the target. Additionally, each item may report the most recent estimate of each target by the associated radar and the most recently calculated uncertainty for each target. In some examples, a base station 105 may use communications manager 102 to transmit an allocation of resources for the UE 115 to use to communicate reports. In some examples, the resources may include periodic sidelink resources, aperiodic sidelink resources, or both, for transmitting the report. The UE 115 may use the communications manager 101-*a* to transmit a report including the set of values for the one or more radar measurement parameters associated with the radar target, an indication of the time value associated with the set of values, a first identifier associated with the radar target, and a second identifier associated with the UE 115. A second UE 115 may use communications manager 101-*b* may receive the report.

By way of example, a first UE 115 may measure radar parameters and may transmit a two-item list of targets (e.g., (first target, first target uncertainty, second radar identifier), (second target, second target uncertainty, first radar identifier)) to a second UE 115. The second UE 115 may update one or more items in the list, resulting in a new list (e.g., (updated first target, updated first target uncertainty, second radar identifier), (second target, second target uncertainty, first radar identifier)). The second UE 115 may calculate the updated first target uncertainty by combining that from the first UE 115 with that which the second UE 115 had autonomously determined. The second UE 115 may then broadcast the new list of targets. Thus, sharing a comprehensive list of target information may allow UEs 115 to share statistically independent knowledge from other UEs 115 while preventing false confidence enhancement, thereby increasing communal knowledge of the proximal environment.

Figure 2:
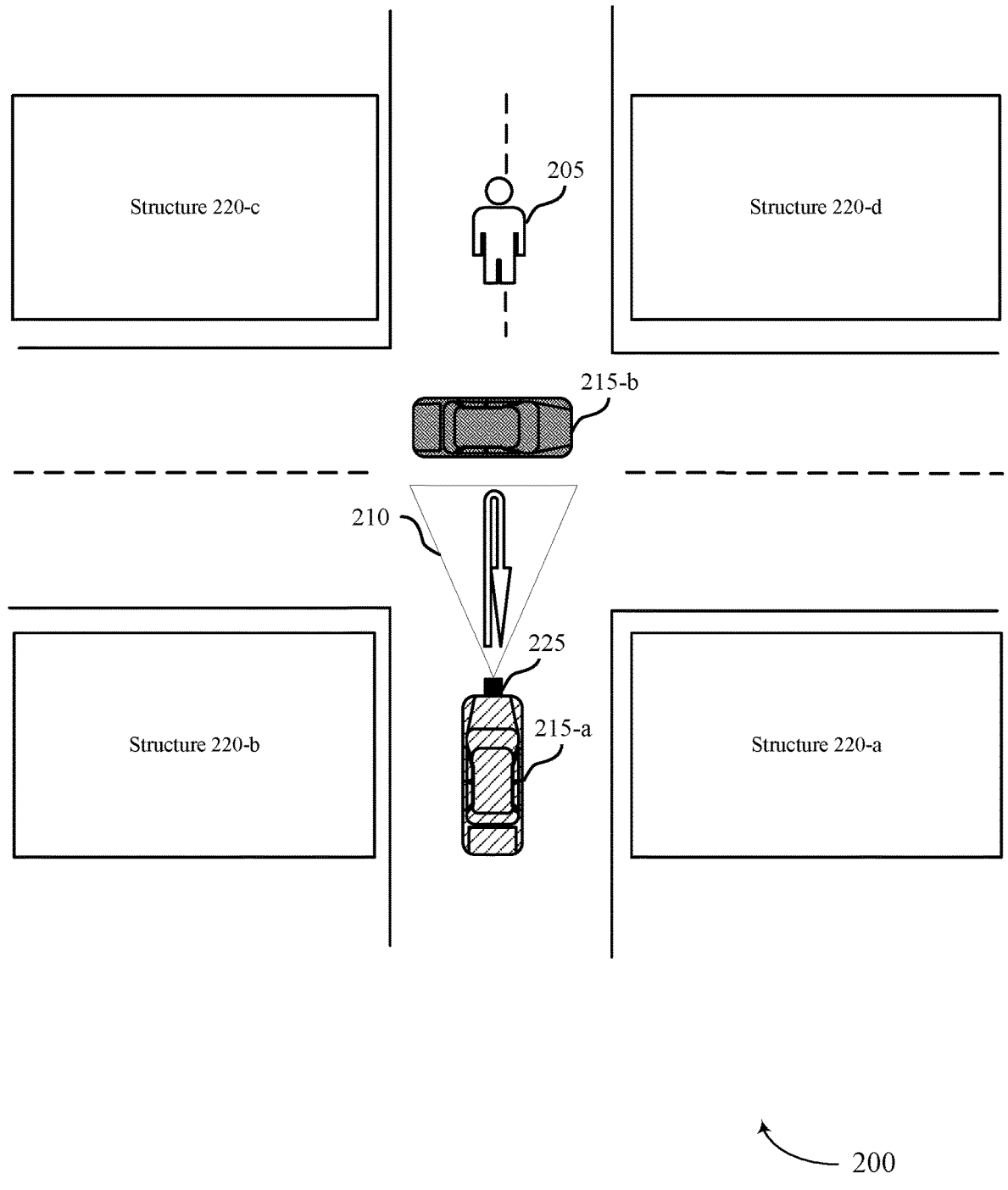
FIG. 2 illustrates an example of a wireless communications system that supports cooperative radar sensing in wireless communications in accordance with one or more aspects of the present disclosure.

FIG. 2 illustrates an example of a wireless communications system 200 that supports cooperative radar sensing in wireless communications in accordance with one or more aspects of the present disclosure. In some examples, wireless communications system 200 may implement aspects of wireless communications system 100. Wireless communications system 200 may include one or more UEs 215 (e.g., UE 215-*a* and UE 215-*b*), which may be examples of corresponding devices described with reference to FIG. 1. In some examples, UEs 215 may be vehicles (e.g., in a V2X system) equipped with radar transmitters, may be vehicles carrying or connected to other UEs, or UEs carried by drivers of vehicles (e.g., UEs 215), or the like. For example, UE 215 may be an example of a vehicle with a radar transmitter 225. The UE 215 may use the radar transmitter 225 to perform radar sensing using radar measurement signals 210.

In some examples, UEs 215 may perform radar sensing to identify one or more objects. For instance, UEs 215 may attempt to identify other UEs 215 (e.g., other vehicles, other devices carried by pedestrians or within other vehicles, or the like), pedestrians 205, structures 220, or the like. In performing radar sensing, a UE 215 may transmit and monitor for a radar measurement signal 210. For instance, the UE 215-a may transmit radar measurement signal 210 (e.g., radar waveform) using radar transmitter 225. In some examples, the UE 215-a may include one or more radar transmitters, which may be oriented in multiple directions to perform radar sensing in multiple directions. In the example where the UE is a vehicle, radar transmitters may be mounted on driver or passenger doors, rear bumpers or trunks, front bumpers or hoods, or the like. For instance, a radar transmitter mounted on the front of the UE 215-a may transmit the radar measurement signal 210 in a forward direction (e.g., the direction viewed by the driver of the UE 215-a). The UE 215-a may monitor for a reflection of the radar measurement signal 210. The radar measurement signal 210 may be, for instance, a frequency modulated continuous waveform (FMCW) waveform, and may sweep through a frequency range over time.

As depicted in the example of FIG. 2, a UE 215 (e.g., a vehicle such as UE 215-a) may support radar sensing by transmitting a radar waveform and detecting a reflected radar waveform. In some examples, a UE 215 may experience radar interference or blockage. In some cases, an object may block a radar target, resulting in failure to detect that object. For instance, the UE 215-a may be unable to detect some objects due to factors such as interference, physical blockages, detection range, radar blind spots, interference, or the like. In some examples, the UE 215-a may be unable to detect pedestrian 205 due to UE 215-b blocking the radar measurement signal 210. The UE 215-a may transmit a radar measurement signal 210 (via radar transmitter 225) and may monitor for a reflection of the radar measurement signal 210. Radar measurement signal 210 may reflect off of the UE 215-b. However, due to the location of the UE 215-b, the radar measurement signal 210 may not reach or be reflected off of pedestrian 205. In such examples, the UE 215-a may fail to detect or identify the presence, location, velocity, or the like, of pedestrian 205. Similarly, other UEs 215, other pedestrians 205, or other obstacles may be invisible with respect to radar sensing for UE 215-a (e.g., as a result of the locations of one or more radar targets, the location of one or more structures 220), or the like. Additionally or alternatively, the UE 215-a may be unable to detect objects located outside of a threshold detectable range.

In some examples, the UE 215-b may support radar sensing. The UE 215-b may detect a pedestrian 205 (e.g., with a side-mounted radar (not shown)). In some examples, the UE 215-b may transmit a report (e.g., a broadcast message) to one or more proximal UEs 215 indicating the location of pedestrian 205. Upon receiving the report from the UE 215-b, the UE 215-a may identify the location of the pedestrian 205. However, in some examples, the UE 215-a may be unable to transmit the received location of pedestrian 205 to other UEs 215. That is, UEs 215 may refrain from sharing target information which they receive from other UEs 215. In some examples, however, a UE may share target information with other UEs. Notably, sharing radar information associated with a radar target received from another UE 215 may result in false confidence enhancement. For example, if the UE 215-a broadcasts a report including radar information associated with the pedestrian 205 (e.g., information which UE 215-a previously received from the UE 215-b) and the UE 215-b received such radar information, then the UE 215-b may calculate one or more false variances corresponding to the target parameters of the pedestrian 205.

A method for cooperative vehicular radar sensing with knowledge dissemination is described herein, where UEs 215 may broadcast statistically independent information received from other UEs to mitigate false confidence enhancement. The method may include a UE transmitting a report including a list, where each item in the list may include an identifiable target, an associated radar identifier, and a timestamp corresponding to the identification of the target.

According to one or more aspects, a UE 215 may use radar to identify one or more parameter values related to a radar target at a particular timestamp. That is, the UE 215 may measure one or more radar measurement parameters associated with a radar target. In some examples, the one or more radar measurement parameters may include a set of values and a time value associated with the set of values. The set of values may include target location, target velocity, target dimensions, target orientation, and respective uncertainty values for each parameter value, etc. The UE 215 may transmit a report including the set of values for the one or more radar measurement parameters associated with the radar target, an indication of the time value associated with the set of values, a first identifier associated with the radar target, and a second identifier associated with the UE 215. In some examples, the UE 215 may broadcast the report to other UEs.

Figure 3A:
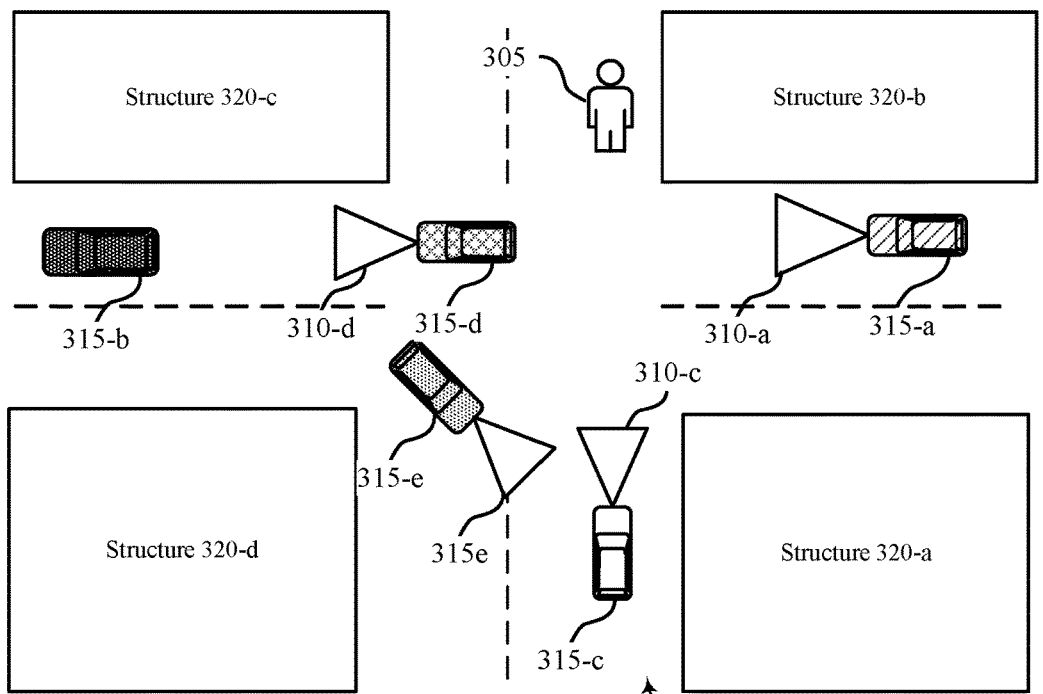
FIGS. 3A and 3B illustrate examples of wireless communications systems that support cooperative radar sensing in wireless communications in accordance with one or more aspects of the present disclosure.

FIG. 3A illustrates an example of a wireless communications system 300 that supports cooperative radar sensing in wireless communications in accordance with one or more aspects of the present disclosure. In some examples, wireless communications system 300 may implement aspects of wireless communications systems 100 and 200 as described with reference to FIGS. 1 and 2, respectively. Wireless communications system 300 may include one or more UEs 315 (e.g., UE 315-a, UE 315-b, UE 315-c, UE 315-d, and UE 315-e), which may be examples of corresponding devices as described with reference to FIGS. 1 and 2. FIG. 3A illustrates various UEs 315 as physically located in wireless communications system 300.

Figure 3B:
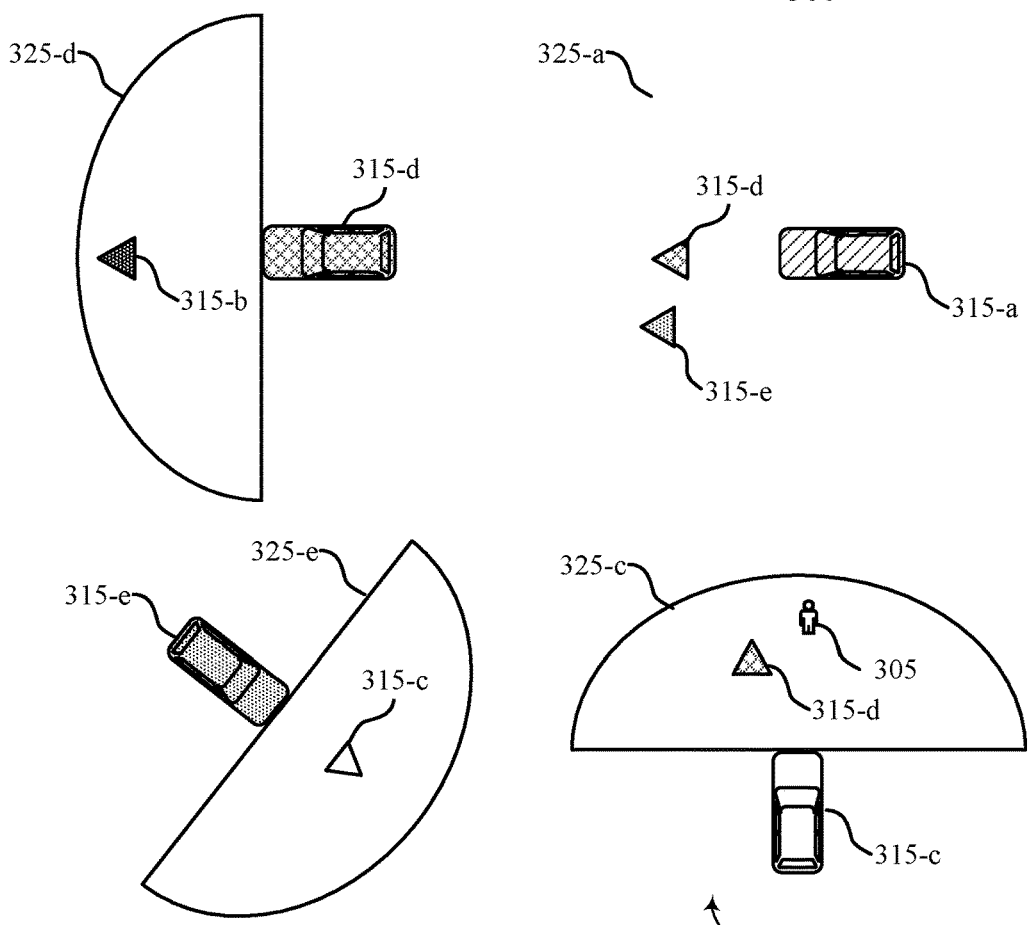

FIG. 3B illustrates an example of a wireless communications system 301 that supports cooperative radar sensing in wireless communications in accordance with one or more aspects of the present disclosure. Wireless communications system 301 may include one or more UEs 315 (e.g., UE 315-a, UE 315-c, UE 315-d, and UE 315-e), which may be examples of corresponding devices as described with reference to FIGS. 1 and 2. For instance, FIG. 3B illustrates various UEs 315 and their respective sensing coverage based on their physical location within wireless communications system 300.

In some examples, UEs 315 may perform radar sensing to identify objects (e.g., other vehicles (e.g., UEs 315), pedestrians 305, structures 320, or the like. For instance, UEs 315 may operate in and around an intersection, as illustrated with reference to FIG. 3A. In some examples, UEs 315 may include a radar transmitter. UEs 315 may navigate with respect to other UEs 315, structures 320 (e.g., structure 320-a, structure 320-b, structure 320-c, and structure 320-d). UEs 315 may also communicate with one or more base stations (e.g., base stations 105 as described with reference to FIG. 1). Base stations may be a roadside unit (RSU), such as a smart stoplight at an intersection, a base station, a repeater, or the like.

As depicted in the example of FIG. 3A, UEs 315 may transmit radar measurement signals 310, as described with reference to FIG. 2. In some examples, UEs 315 may monitor for reflections of transmitted radar measurement signals to identify one or more values associated with one or more radar measurement parameters (described hereinafter as "radar measurement parameter values") for each locally positioned object within wireless communications system 300. However, some UEs 315 may detect blockage, interference, radar sensing range, or the like in their radar sensing. Thus, a UE 315 may be unable to identify all relevant radar targets (e.g., all relevant objects, including structures 320, pedestrians 305 UEs 315, or other objects such as trees, medians, barriers, crossing gates, or the like). Thus, each UE 315 may use radar sensing to identify radar targets located within respective sensing coverages 325. However, some UEs 315 may be unable to identify all relevant radar targets. For example, the UE 315-a may transmit radar measurement signal 310-a. Additionally or alternatively, the UE 315-a may receive a reflection of radar measurement signal 310-a off of the UE 315-d (e.g., which may be driving in front of UE 315-a), and may receive a reflection of radar measurement signal 310-b off of UE 315-e (which may be turning away from the UE 315-a down another street between structure 320-d and structure 320-a). The UE 315-a may thus identify the UE 315-d and the UE 315-e within sensing coverage 325-a. However, the UE 315-d may be located between the UE 315-a and the UE 315-b. Thus, the radar measurement signal 310-a may not reach the UE 315-b, and the UE 315-a may be unable to determine radar measurement parameter values (e.g., position, velocity, orientation, etc.) for the UE 315-b because of blockage caused by the UE 315-d.

In some examples, the UE 315-b may be located outside the effective range of the UE 315-a. In such cases, the UE 315-a may be unable to sense the UE 315-b even if the UE 315-d were not located between the UE 315-a and the UE 315-b. Similarly, due to the position of the structure 320-b, the radar measurement signal 310-a may not reach or reflect off of the pedestrian 305. As depicted in the example of FIG. 3A, the pedestrian 305 may be approaching a crosswalk toward which the UE 315-a is driving. Thus, radar measurement parameter values for the pedestrian 305 (e.g., position, velocity, orientation, etc.) may be particularly relevant for the UE 315-a. For instance, the UE 315-a may prepare safety precautions when an approaching pedestrian is detected. However, the UE 315-a may not sense pedestrian 305, and thus may fail to prepare such safety measures.

Similarly, the UE 315-d may transmit radar measurement signal 310-d, which may reflect off of the UE 315-b. The UE 315-d may thus sense the presence of the UE 315-b within sensing coverage 325-d, and may be able to identify one or more radar measurement parameter values for the UE 315-b. However, the UE 315-d may be unable to sense the UE 315-e (e.g., which may be next to or behind the UE 315-d). In some examples, the UE 315-d may be unable to sense the pedestrian 305 (e.g., based on the location of the pedestrian 305, or blockage generated by a structure 320), or may be unable to sense the UE 315-c (e.g., based on the location of the UE 315-c on the other side of the UE 315-e), or the like. Additionally or alternatively, the UE 315-c may sense the pedestrian 305 (e.g., who may be located directly in front of the UE 315-e without any blockage or interference) within sensing coverage 325-c, but may be unable to sense one or more of UE 315-e, UE 315-d, UE 315-b, and UE 315-a (e.g., because of their respective locations with reference to each other, structures 320-a, or the like). The UE 315-e may sense the UE 315-c within sensing coverage 325-e, but may be unable to sense one or more of UE 315-b, UE 315-d, UE 315-a, and pedestrian 305 (e.g., based on the location, orientation, or direction of other UEs, or the location of structures 320, or the like).

Additionally, or alternatively, in some cases, the UEs 315 may sense each other, but may erroneously determine one or more radar measurement parameter values (e.g., position, velocity, or the like) based on interference. For instance although the UE 315-a may be able to sense the UE 315-d, if the UE 315-d were to transmit a radar measurement signal in a reverse direction (e.g., toward the UE 315-a), then the UE 315-a may erroneously determine that the UE 315-d is located halfway between the UE 315-a and the actual location of the UE 315-d. The UE 315-a may erroneously identify a very low uncertainly level associated with the position parameter value of the UE 315-d, based on the high power at which the UE 315-a received a radar measurement signal transmitted by the UE 315-d. Thus, the UE 315-a may erroneously determine that it should brake, swerve, or otherwise take safety measures based on a falsely detected radar target or falsely enhanced confidence associated with the radar target (e.g., when the UE 315-d is actually located a safe distance ahead of the UE 315-a). Thus, UEs 315 may experience interference, blockage, or the like, which may result in a failure to identify actual radar targets, or erroneously detecting false radar targets, or the like. However, each UE 315 may have at least some relevant information regarding objects located within wireless communications system 300.

In some examples, UEs 315 may perform cooperative radar sensing, and may share target information regarding sensed radar targets with each other. UEs 315 may transmit, to each other, reports including sets of values for one or more radar measurement parameters for each detected radar target at a particular time. Each report may include values for parameters such as position, velocity, orientation, radar cross section, direction of angle, signal strength, or the like. UEs 315 may exchange reports periodically, or on demand, on sidelink resources negotiated between UEs 315, indicated by a base station, or a combination thereof.

Sharing such reports may allow the UEs 315 to gain more information corresponding to the area proximal to the UEs 315. For instance, a UE 315-a may receive a report from a UE 315-c including sets of values corresponding to the radar measurement parameters associated with a UE 315-d and a pedestrian 305. As such, the UE 315-a may combine its own measured radar measurement parameter values with that received in the report from the UE 315-c, resulting in one or more enhanced (or gained) target values (e.g., reduced radar measurement parameter variances corresponding to the UE 315-d and gaining information corresponding to the pedestrian 305). Combining target information is described in greater detail with reference to FIG. 4. However, in some examples, UEs 315 may not share target information received from other UEs 315. In fact, in such an example, UEs 315 may share target information which has been autonomously measured (e.g., the UE 315-a may share target information which the UE 315-a has measured). Consequentially, omitting information from shared knowledge may be inefficient.

In some cases, UEs 315 may share reports with one another such that UEs 315 may share target information received from other UEs 315. Specifically, a UE 315 may transmit (e.g., broadcast) a message, to other UEs 315, including one or more items. Each item may include one target (e.g., radar measurement parameter values), a target identifier, and one corresponding radar (e.g., radar identifier of the radar used to determine the radar measurement parameter values associated with the target). Each item may further include uncertainties corresponding to the target (e.g., position variance, velocity variance, orientation variance, etc.). Additionally or alternatively, each item may exhibit the most recent estimate of each target by the associated radar and the most recently calculated uncertainty for each target. The comprehensive list of target information is described in greater detail with reference to FIG. 4.

Figure 4:
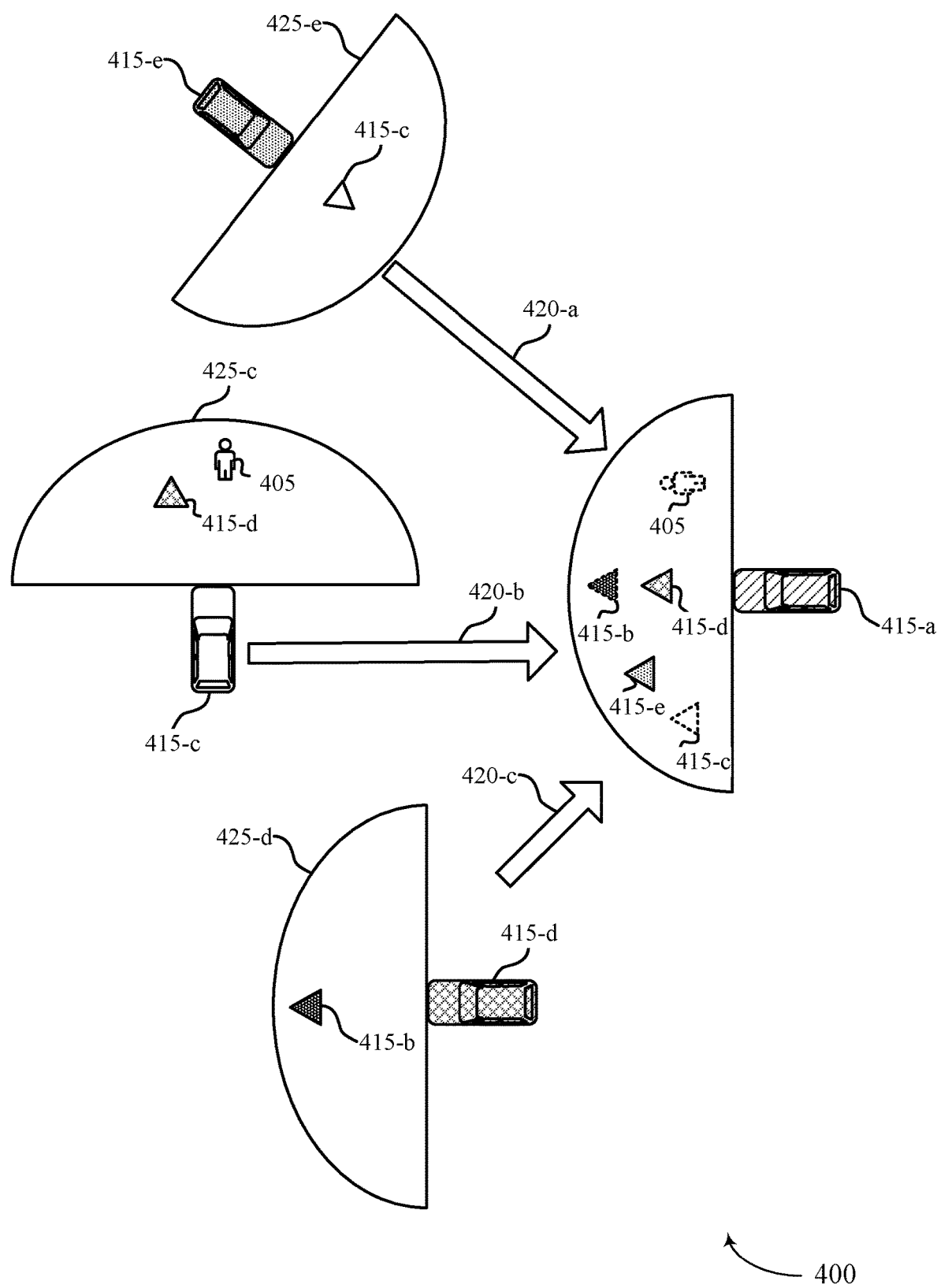
FIG. 4 illustrates an example of a wireless communications system that supports cooperative radar sensing in wireless communications in accordance with one or more aspects of the present disclosure.

FIG. 4 illustrates an example of a wireless communications system 400 that supports cooperative radar sensing in wireless communications in accordance with one or more aspects of the present disclosure. In some examples, wireless communications system 400 may implement aspects of wireless communications system 100. Wireless communications system 400 may include UE 415-a, UE 415-b UE 415-c, UE 415-d, and UE 415-e, which may be examples of corresponding devices with reference to FIGS. 3A and 3B. UEs 415 may communicate, in some examples, with one or more base stations. For instance, UEs 415 may communicate with an RSU, such as a smart light, or the like. In some examples, UEs 415 may communicate with each other via sidelink resources. UEs 415 may operate according to a global clock. The global clock may be based on sidelink synchronization (e.g., synchronized V2X channels), or may be based on global positioning system (GPS) coordination, or the like. Each UE 415 may be able to determine their own respective radar measurement parameter values, such as location, velocity, orientation, or the like (e.g., via radar sensing, or GPS information, or one or more algorithms, or the like).

UEs 415 may perform cooperative radar sensing with knowledge dissemination, as described with reference to FIGS. 2, 3A, and 3B. Each UE 415 may sense one or more objects, and may determine one or more radar measurement parameter values for the detected objects within a corresponding sensing coverage 425. For instance, radar measurement parameters for sensed radar targets may include position, velocity, orientation, or the like. Radar measurement parameters for sensed radar targets may further include estimated radar cross sections, signal strengths, as well as uncertainty levels (e.g., a confidence level) for each radar target. In some cases, UEs 415 may determine the radar measurement parameter values based on identifying a reference frame associated with each measured radar target. Parameter values for each detected radar target may be organized into lists (e.g., tuples), where each tuple is associated with radar measurements taken for a particular radar target at a particular time (e.g., a time stamp).

UEs 415 may generate reports including a list of items. Each item in the list may include a set of values for the one or more radar measurement parameters associated with a single radar target, a target identifier, a corresponding radar identifier (e.g., the radar identifier of the radar that measured the values of the radar measurement parameters), and a timestamp (e.g., the time the radar target was measured).

UEs 415 may perform cooperative radar sensing by transmitting reports including the list of items associated with each radar target. For instance, UEs 415 may exchange reports 420 over sidelink resources. UEs 415 may transmit reports according to a schedule negotiated via sidelink connections, or implicitly determined, or instructed by an RSU, or the like, as described herein. In some cases, UEs 415 may broadcast reports to one or more other UEs 415, unicast reports to particular UEs 415 (e.g., negotiated via sidelink connections), or the like. In some examples, the UE 415-e may transmit the report 420-a. The UE 415-e may be able to sense the UE 415-c within sensing coverage 425-e. The report 420-a may thus include an item corresponding to the UE 415-c including a timestamp at which measurements were taken, radar measurement parameter values measured by the UE 415-e for the UE 415-c, radar measurement parameter values for the UE 415-e, a radar identifier (e.g., the radar that the UE 415-e used to measure the UE 415-c), and a target identifier for the UE 415-c. The report 420-a may be a sidelink broadcast message, received by UE 415-a, UE 415-c, and UE 415-d. In some cases, the report 420-a may be a sidelink unicast message transmitted to and received by the UE 415-a.

As depicted in the example of FIG. 4, the UE 415-a may receive one or more reports 420, and may combine the information received in the reports with each other, or with information determined or measured by the UE 415-a, or both. That is, the UE 415-a may fuse the information within the received reports 420 together, or with its own measurements if available. For example, a particular target may appear in multiple reports 420. In some examples, the UE 415-a may determine that reported items in one or more reports 420 are associated with the same or different targets based on the target identifier associated with each report item. The UE 415-a may further determine the identity of targets based on a smart algorithm, a determination of variations or similarities in radar measurement parameter values, the reference frame associated with each radar target, or any combination thereof. In some examples, the UE 415-a may combine the sets of radar measurement parameter values and uncertainty levels, with the same time stamp, for a particular radar target. In some examples, parameter values with uncertainty at different time stamps may be propagated temporally to a target time stamp as follows:

$$(x_1, v_1, \sigma_{x_1}^2, \sigma_{v_1}^2) \mapsto (x+v\Delta t, \sigma_x^2 + \sigma_v^2 \Delta t^2, \sigma_v^2)$$

where x=position, v=velocity, $\sigma_{x_1}^2$=an uncertainty level for position for a first radar target, and $\sigma_{v_1}^2$=uncertainty level for velocity for the first radar target.

According to one or more aspects, the UE 415-a may combine multiple radar measurement parameter values at the same time stamp (e.g., multiple sets of radar measurement parameter values for a same radar target at a same time stamp) to yield new radar measurement parameter values with lower uncertainty levels. For instance, the UE 415-a may combine a first set of radar measurement parameter values including a first velocity value ($v_1$), a first position value ($x_1$), a first uncertainty value for the first position value ($\sigma_{x_1}^2$) and a first uncertainty value for first the velocity value ($\sigma_{v_1}^2$) with a second set of radar measurement parameter values including a second velocity value ($v_2$), a second position value ($x_2$), a second uncertainty value for the second position value ($\sigma_{x_2}^2$) and a second uncertainty value for the second velocity value ($\sigma_{v_2}^2$) as follows:

$$\left(x_1, v_1, \sigma_{x_1}^2, \sigma_{v_1}^2\right), \left(x_2, v_2, \sigma_{x_2}^2, \sigma_{v_2}^2\right) \mapsto$$

$$\left( \frac{\frac{x_1}{\sigma_{x_1}^2} + \frac{x_2}{\sigma_{x_2}^2}}{\frac{1}{\sigma_{x_1}^2} + \frac{1}{\sigma_{x_2}^2}}, \frac{\frac{v_1}{\sigma_{v_1}^2} + \frac{v_2}{\sigma_{v_2}^2}}{\frac{1}{\sigma_{v_1}^2} + \frac{1}{\sigma_{v_2}^2}}, \frac{1}{\frac{1}{\sigma_{x_1}^2} + \frac{1}{\sigma_{x_2}^2}}, \frac{1}{\frac{1}{\sigma_{v_1}^2} + \frac{1}{\sigma_{v_2}^2}} \right).$$

By combining radar measurement parameter values received in reports 420, the UE 415-*a* may both identify radar targets otherwise not detected by the UE 415-*a*, and may decrease the uncertainty levels of radar targets detected by the UE 415-*a*. For example, the UE 415-*a* may successfully detect the UE 415-*d* and the UE 415-*e* within sensing coverage 425-*a* (e.g., as described in greater detail with reference to FIG. 3A where UE 415-*a* may correspond to UE 315-*a* sensing within sensing coverage 325-*a*). However, due to detection range, obstacles, or interference, the UE 415-*a* may fail to detect (or accurately detect) the UE 415-*c*, the UE 415-*b*, and/or the pedestrian 405. In some examples, the UE 415-*a* may receive report 420-*a*, which may include a set of radar measurement parameter values for the UE 415-*c*, a timestamp (e.g., a time at which the UE 415-*e* performed radar sensing and detected UE 415-*c*, a propagated time-value for the set of parameter values, or the like), a target identifier for the UE 415-*c*, and a radar identifier corresponding to the radar that the UE 415-*e* used to detect the UE 415-*c*. Using the information received from the UE 415-*e* in radar measurement report 420-*a*, the UE 415-*a* may determine that it has no information (e.g., or no current information) about the UE 415-*c*, and may add the UE 415-*c* to a list of detected radar targets.

In some examples, radar measurement report 420-*a* may also include a set of radar measurement parameter values for the UE 415-*e*, a timestamp (e.g., the same timestamp as indicated for the set of parameter values for UE 415-*c*), a UE identifier for the UE 415-*e*, or any combination thereof. The UE 415-*a* may have its own measured set of radar measurement parameter values for the UE 415-*e* based on the radar sensing performed by UE 415-*a*. However, the UE 415-*a* may combine the set of radar measurement parameter values for the UE 415-*e* received in the report 420-*a* with its own set of radar measurement parameter values for the UE 415-*e*, resulting in a combined set of radar measurement parameter values with decreased uncertainty levels. If, for example, the UE 415-*a* had falsely determined that the UE 415-*e* was closer than the actual location of the UE 415-*e*, then the combination of radar measurement parameter values may result in a more accurate determination of the location of the UE 415-*e*. Accordingly, increased confidence values (e.g., decreased uncertainty levels) may result in the UE 415-*a* more accurately taking (or avoiding) safety measures to avoid a collision with the UE 415-*e*.

Similarly, the UE 415-*c* may sense the UE 415-*d* and the pedestrian 405 within sensing coverage 425-*c*. The UE 415-*c* may transmit report 420-*b* including a list of items associated with each of the UE 415-*d* and the pedestrian 405. Each item may include a set of radar measurement parameter values, a time stamp, a radar identifier, and a target identifier. Report 420-*b* may also include a set of radar measurement parameter values for the UE 415-*c*, the time stamp, a UE identifier for the UE 415-*c*, or any combination thereof. Upon receiving the report 420-*b*, the UE 415-*a* may add the UE 415-*c* and the pedestrian 405 to a list of radar targets. In some examples, the UE 415-*a* may receive a set of radar measurement parameter values for the UE 415-*c* from the UE 415-*e* in report 420-*a*, and may receive a set of radar measurement parameter values for the UE 415-*c* from the UE 415-*c* in report 420-*b*. In such cases, the UE 415-*a* may combine the set of radar measurement parameter values received for the UE 415-*c* from the UE 415-*e* and the set of radar measurement parameter values (at the same timestamp) for the UE 415-*c* from the UE 415-*c*, resulting in a new set of radar measurement parameter values for the UE 415-*c* with lower uncertainty levels. The UE 415-*d* may be able to sense the UE 415-*b* within sensing coverage 425-*b*, and may transmit a report 420-*c* including a set of radar measurement parameter values, a time stamp, a radar identifier (e.g., the radar that the UE 415-*d* used to detect the UE 415-*b*, and a target identifier (e.g., associated with the UE 415-*b*). Report 420-*c* may also include a set of radar measurement parameter values associated with the UE 415-*d*. In some examples, the UE 415-*a* may receive radar measurement report 420-*c*, and may add the UE 415-*b* to a list of radar targets. Without receiving report 420-*c*, the UE 415-*a* may be unable to detect the UE 415-*b* (e.g., as a result of blockage by the UE 415-*d*, limited sensing range, or both). However, having received report 420-*c* including the set of radar measurement parameter values for UE 415-*b*, UE 415-*a* may add UE 415-*b* to the list of detected radar targets, effectively increasing the sensing range and sensing accuracy of the UE 415-*a*.

In some cases, UEs 415 may include their own measurements within reports 420. That is, UEs 415 may refrain from sharing information received from other UEs 415. For instance, UE 415-*a* may receive report 420-*a* from UE 415-*e*. If the UE 415-*a* generates a report 420 to be shared with one or more other UEs 415, the UE 415-*a* may omit the target information received in report 420-*a* from the generated report 420. However, emitting target information from shared knowledge may be inefficient.

As depicted herein, a target may be identifiable by a radar (e.g., via tagging a target with estimated location and velocity). Additionally or alternatively, a radar may be identifiable (e.g., using tag from serial number, or an identifier assigned to or negotiated through sidelink). In some instances, each item in the list may be or include at least one of the most recent estimate of the associated target by the associated radar, the most recently calculated uncertainty for the estimate, or both. If the estimates in the message are relative, the message may also include information to make estimates independent of the first radar. For example, if relative position or velocity estimates are included in the list, the message (e.g., report) may also include the radar's own position or velocity. This, aspects of the present disclosure provides for dissemination of estimates without uncertainty separately for each originating radar such that each radar may identify and extract statistically independent estimates. Upon receiving one or more broadcast messages from neighboring radars. the first radar may attempt to merge these messages, together with its own measurements, if available. As part of merging the messages, the first radar may replace any item in the list associated with the first radar with its most recent estimate and/or uncertainty. Additionally or alternatively, the first radar may fuse any item for a second radar with the same item in the list of another message from a neighboring radar and replacing an older item with the most recent item (according to time stamp). As depicted herein, radars can selectively combine estimates of the same target in the message.

According to one or more aspects of the present disclosure, UEs 415 may perform knowledge dissemination by communicating information received from other UEs 415. For instance, the UE 415-*a* may generate a report 420 to transmit to one or more other UEs 415. The report 420 may include a combined list of items where the combined list of items may include radar measurement parameter values, time stamps, target identifiers, and radar identifiers as measured and indicated from other UEs 415, measured by the UE 415-*a*, or a combination thereof. Each item in the list may include the most recently measured radar parameter values associated with a target, the most recently calculated uncertainty values, a time stamp corresponding to the most recent target measurement, a target identifier, and the radar identifier of the radar which measured the target. For example, the UE 415-*a* may generate a report 420 combining the report 420-*b* from the UE 415-*c* with its own radar information. As such, the UE 415-*a* may generate a report 420 including a three-item list with an item corresponding to each of the UE 415-*d*, the UE 415-*e*, and the pedestrian 405.

In some examples, the UE 415-*c* may have measured the UE 415-*d* and the pedestrian 405 with a first radar at a first time. Additionally or alternatively, the UE 415-*a* may have measured the UE 415-*d* and the UE 415-*e* with a second radar at a second time later than the first time. In this example, the UE 415-*a* may generate a report with a list including the following items: a first item corresponding to the UE 415-*d* (e.g., (radar measurement parameter values measured by UE 415-*a*), (combined uncertainties from UE 415-*c* and UE 415-*a*), (time stamp associated with the second time), (UE 415-*d* target identifier), (second radar identifier)) and a second item corresponding to UE 415-*e* (e.g., (radar measurement parameter values measured by UE 415-*a*), (uncertainties from UE 415-*a*), (time stamp associated with the second time), (UE 415-*e* target identifier), (second radar identifier)), and a third item corresponding to pedestrian 405 (e.g., (radar measurement parameter values measured by UE 415-*c*), (uncertainties from UE 415-*c*), (time stamp associated with the first time), (pedestrian 405 target identifier), (first radar identifier)). Additionally or alternatively, the UE 415-*a* may include target information associated with the UE 415-*a* in the generated report 420. For example, the UE 415-*a* may include its own radar measurement parameter values (e.g., position, velocity, orientation, related uncertainties, etc.) and a time stamp associated with its own radar measurement parameter values within the report 420. Generating and transmitting such a report preserves the statistical independence of measured radar information, allowing UEs 415 to exchange reports 420 including information received from other UEs 415. Thus, aspects of the present disclosure provides for transmission of a report by a first radar. The report may include a list, where each item in the list is associated with one target and one radar—either the first radar itself or one of its neighbors.

In some examples, UEs 415 may exchange reports 420 periodically. UEs 415 may independently negotiate periodic sidelink resources on which to periodically transmit reports 420. In some examples, a base station (e.g., an RSU) may allocate periodic resources for transmitting reports 420.

In some examples, UEs 415 may exchange reports 420 in an on-demand configuration. For instance, the UE 415-*a* may transmit a sidelink message requesting transmission of reports 420 (e.g., from any UE 415 that receives the request, or that is within a predetermined, predefined, configured, or standardized distance from UE 415-*a*, or both). Upon receiving the sidelink request message, the UE 415-*e*, the UE 415-*c*, and the UE 415-*d* may transmit report 420-*a*, report 420-*b*, and report 420-*b*, respectively. In some examples, the UE 415-*a* may perform a handshake operation with other UEs 415. For instance, the UE 415-*a* may transmit an indication of a set of sidelink resources that are available for communicating reports 420, or for transmitting sidelink request messages, or both. In such cases, other UEs 415 may provide a second set of sidelink resources (or an indication of a subset of the first set of sidelink resources) that are available for communicating reports 420, or for transmitting or receiving sidelink request messages, or both. In such examples, responsive to the received message indicating the second set of sidelink resources, UE 415-*a* may transmit the request for reports 420 on at least some of the indicated second set of sidelink resources (e.g., during a portion of the first set of sidelink resources that overlap with the second set of sidelink resources).

Figure 5:
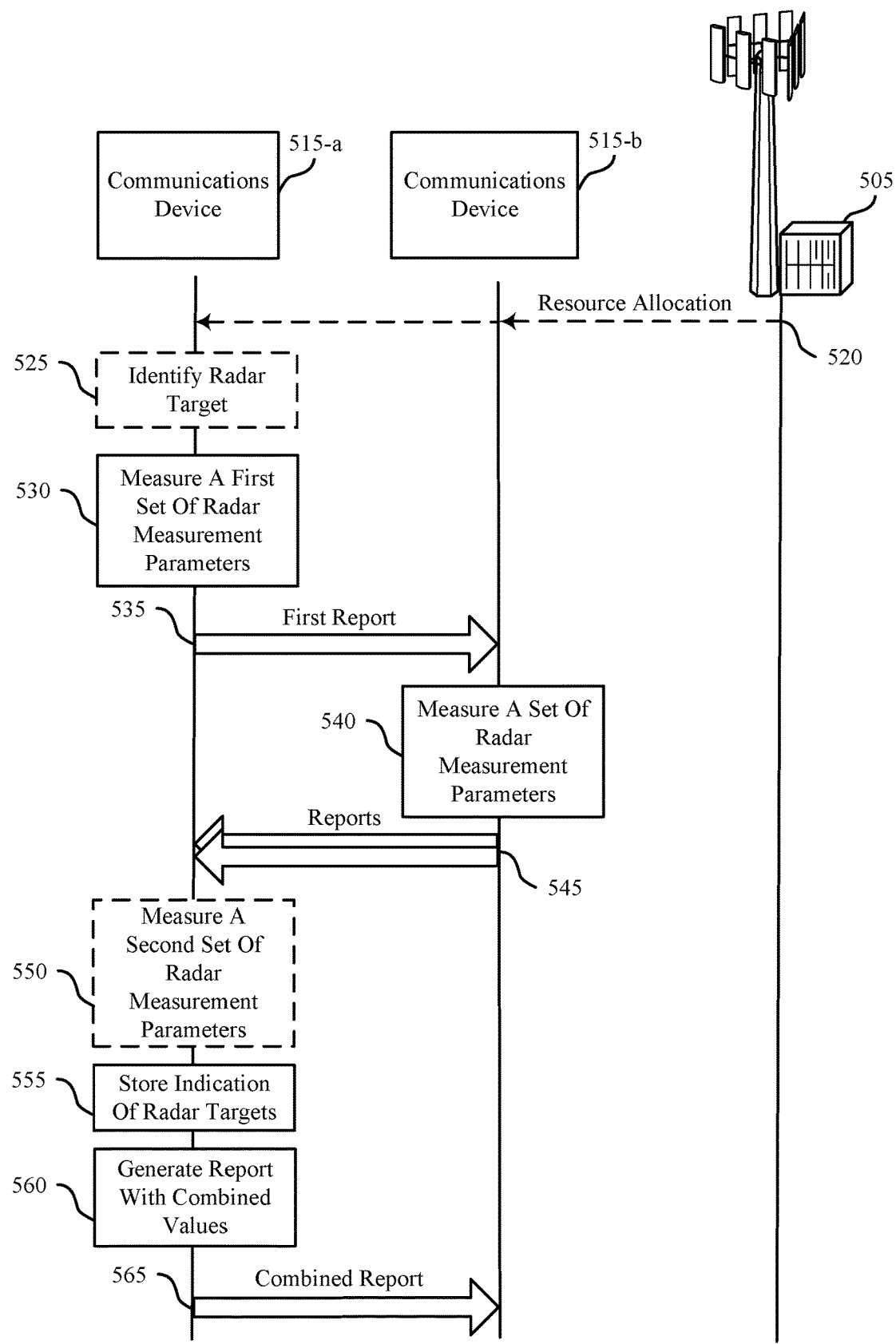
FIG. 5 illustrates an example of a process flow that supports cooperative radar sensing in wireless communications in accordance with one or more aspects of the present disclosure.

By performing cooperative radar sensing with knowledge dissemination as described herein, UEs 415 may share target information as received from other UEs along with independently measured target information, thereby expanding the shared knowledge between UEs 415 while avoiding false confidence enhancement. Phrased alternatively, generating and transmitting reports including the most recently measured target information, the most recently calculated uncertainties, measurement time stamps, target identifiers, and corresponding measuring radar identifiers may allow UEs 415 to reliably detect the proximal area FIG. 5 illustrates an example of a process flow 500 that supports cooperative radar sensing in wireless communications in accordance with one or more aspects of the present disclosure. In some examples, the process flow 500 may implement aspects of wireless communications systems 100 and 400 as described with reference to FIGS. 1 and 4. For example, the process flow 500 may include communications devices 515 which may be examples of UEs 415 as described with reference to FIG. 4. Further, the process flow 500 may include base station 505 which may be an example of base stations 105 as described with reference to FIG. 1. Additionally, the base station 505 may be an example of an RSU, a repeater node, an access point, or the like. Alternative examples of the following may be implemented, where some operations are performed in a different order than described or are not performed at all. In some cases, operations may include additional features not mentioned below, or further operations may be included.

In some cases, communications devices 515 may be proximal to one another and may engage in communications with one another via a wired or wireless connection (e.g., a sidelink connection, a Bluetooth connection, etc.). Additionally, one or both of communications devices 515 may be in a coverage zone corresponding to the base station 505. As such, the communications devices 515 may be connected to the base station 505.

At 520, the base station 505 may optionally transmit an allocation of resources to communications devices 515. The allocation of resources may be or include an allocation of resources for the communications devices 515 to use to communicate reports. The resources may include periodic sidelink resources, aperiodic sidelink resources, or both. Upon receiving the allocation of resources, the communications devices 515 may use the allocated resources to transmit reports (e.g., including radar measurement information) to one another. Alternatively, the communications devices 515 (e.g., communications device 515-*a* and/or communications device 515-*b*) may determine such resources through one or more of a handshake procedure (e.g., sidelink negotiated), predefined resource definition, or the like.

At 525, the communications device 515-*a* may optionally identify a radar target. In some cases, the communications device 515-*a* may identify a reference frame (e.g., a bounding box) associated with the radar target. For example, the communications device 515-*a* may identify a first position associated with the radar target relative to a second position associated with the communications device 515-*a*. In some examples, the communications device 515-*a* may identify a first velocity associated with the radar target relative to a second velocity associated with the communications device 515-*a*.

At 530, the communications device 515-*a* may measure (e.g., with a first radar) a first set of radar measurement parameters corresponding to the identified radar target. The radar measurement parameters may include at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof. Upon measuring the first set of radar measurement parameters, the communications device 515-*a* may identify a set of values corresponding to each of the radar measurement parameters along with a time value associated with the set of values (e.g., the time the measurement was taken). For example, the communications device 515-*a* may measure a position, velocity, and orientation at a first time corresponding to the radar target. In this case, the values corresponding to the measured position, velocity, and orientation of the radar target may be the set of values corresponding to the first set of radar measurement parameters and the first time may be the time value associated with the set of values. Measuring the set of values corresponding to the first set of radar measurement parameters may be based on the identified reference frame associated with the radar target.

At 535, the communications device 515-*a* may transmit a first report to the communications device 515-*b*. The communications device 515-*a* may transmit the first report directly to the communications device 515-*b* (e.g., via a unicast sidelink message) or to one or more communications devices 515 (e.g., via a broadcast sidelink message). Within the first report, the communications device 515-*a* may include the set of values for the first set of radar measurement parameters associated with the radar target, an indication of the time value associated with the set of values, an identifier associated with the radar target (e.g., a first target identifier), and an identifier associated with the communications device 515-*a* (e.g., the radar identifier of the radar communications device 515-*a* used to identify and measure the radar target). For example, the communications device 515-*a* may measure the radar measurement parameters for the radar target with a first radar at a first time. Thus, the first report may include the following: a first item corresponding to the radar target (e.g., (position, position uncertainty, velocity, velocity uncertainty), (the first time), (a first target identifier), (a first radar identifier)). Upon receiving the first report, the communications device 515-*b* may identify the radar target and perform subsequent operating procedures therefrom (e.g., combining the information in the first report with its own measurement data).

At 540, the communications device 515-*b* may measure a set of radar measurement parameters for the radar target. In some examples, the set of radar measurement parameters may be the same as the first set of radar measurement parameters. In other examples, the set of radar measurement parameters may be different from the first set of radar measurement parameters.

At 545, the communications device 515-*b* may transmit one or more reports to the communications device 515-*a*. In some examples, the communications device 515-*b* may transmit a second report and a third report to the communications device 515-*a*. For instance, the second report may include a second set of values corresponding to the set of radar measurement parameters associated with the radar target, a time value corresponding to the measurement of the radar target (e.g., a second time), an identifier corresponding to the radar target (e.g., a first target identifier), and an identifier corresponding to the communications device 515-*b* (e.g., a second radar identifier). The third report may include a third set of values corresponding to the set of radar measurement parameters associated with the radar target, a time value corresponding to the measurement of the radar target (e.g., a third time value), an identifier corresponding to the radar target (e.g., a first target identifier), an identifier corresponding to the communications device 515-*b* (e.g., a second radar identifier). In some cases, the communications device 515-*b* may be equipped with more than one radar. If the communications device 515-*b* measures the radar target with more than one radar, the second report and the third report may include indications of the separate radars. For example, the second report may include a second radar identifier while the third report may include a third radar identifier.

Upon receiving the second report and the third report, the communications device 515-*a* may combine one or more sets of values. For instance, the communications device 515-*a* may combine the first set of values (e.g., its own measured values) and the second set of values (e.g., values measured by the communications device 515-*b*) according to the combination procedures as described with reference to FIG. 4. Additionally, or alternatively, the communications device 515-*a* may generate a combined set of values by combining the second set of values and the third set of values (e.g., both sets measured by the communications device 515-*b*) according to the combination procedures. In such a case, the communications device 515-*b* may have measured the second set of values at a second time and the third set of values at a third time later than the second time where generating the combined set of values may be based on determining that the second time is earlier than the third time.

At 555, the communications device 515-*a* may store indications of one or more radar targets. The communications device 515-*a* may store the indications of the radar targets as the most recently measured target information. By way of the previous example, the communications device 515-*a* may store the indication of the radar target corresponding to the measurements by the communications device 515-*b* based on determining that the second time is earlier than the third time.

At 560, the communications device 515-*a* may generate a report with combined values. The report may include the most recently measured set of values corresponding to the radar target, the most recently calculated uncertainty values corresponding to the radar target, the time the set of values were measured, a target identifier corresponding to the radar target, and a radar identifier corresponding to the radar that measured the most recent set of values. By way of a first example, the communications device 515-*a* may generate a combined report including the combination of its own measured set of values with those measured by a different communications device 515 for the same radar target. The communications device 515-*a* may measure a first set of values at a first time with a first radar and communications device 515-*b* may measure a second set of values at a second time, later than the first time, with a second radar. As such, the communications device 515-*a* may generate a combined report with the second set of values (e.g., including the combined uncertainties combined from the first set of values and the second set of values), the second time, the first target identifier (e.g., that corresponding to the radar target), and the second radar identifier.

In a second example, the communications device 515-*a* may generate a combined report including the combination of two sets of its own measured values for the same radar target. At 550, the communications device 515-*a* may optionally measure a second set of values for one or more radar measurement parameters corresponding to the radar target with the first radar at a second time later than the first time. As such, the communications device 515-*a* may generate a combined report with the second set of values (e.g., including the second set of uncertainty values), the second time, the first target identifier, and the first radar identifier.

In a third example, the communications device 515-*a* may generate a combined report including two sets of values corresponding to two separate radar targets. In some cases, the two sets of values may correspond to sets of values measured by the communications device 515-*a*, the communications device 515-*b*, a different communications device 515, or a combination thereof. For instance, at 550, the communications device 515-*a* may measure a second set of values for one or more radar measurement parameters associated with a second radar target with a first radar at a second time. As such, the combined report may include an indication of the radar target (e.g., (first set of values associated with the radar target), (first time), (first target identifier), (first radar identifier)) and an indication of the second radar target (e.g., (second set of values associated with the second radar target), (second time), (second target identifier), (first radar identifier)). These three examples may be expanded to combining any number of sets of values. Moreover, these examples may be combined in any fashion. For instance, the communications device 515-*a* may combine sets of values corresponding to a first radar target and a second radar target with sets of values measured by communications device 515-*a* corresponding to the second radar target and a third radar target. Such a combination may result in a combined report with three indications corresponding to three radar targets which may adhere to the structure of such indications as described herein.

As depicted herein, the combined report may include sets of values associated with the radar targets relative to corresponding values associated with the communications device 515. For instance, the communications device 515-*a* may generate the combined report including a first set of values associated with the radar target, the first position associated with the radar target, the second position associated with the communications device 515-*a*, the first time, the first target identifier, and the first radar identifier. In such an example, the first position and second position may be replaced or reported along with one or more other radar measurement parameters (e.g., a first velocity associated with the radar target and a second velocity associated with the communications device 515-*a*, a first orientation associated with the radar target and a second orientation associated with the communications device 515-*a*, etc.).

At 565, the communications device 515-*a* may transmit the combined report to one or more other communications devices 515. In the example of process flow 500, communications device 515-*a* may transmit the combined report to communications device 515-*b*.

Allowing communications devices 515 to share information measured by other communications devices 515 may expand the amount of communal knowledge in a communications system. Sharing the most recently measured information including the identifier of the measuring communications device 515 prevents the sharing of statistically dependent data, thereby mitigating false confidence enhancement. Thus, cooperative radar sensing with knowledge dissemination may result in enhanced system knowledge and greater system efficiency.

Figure 6:
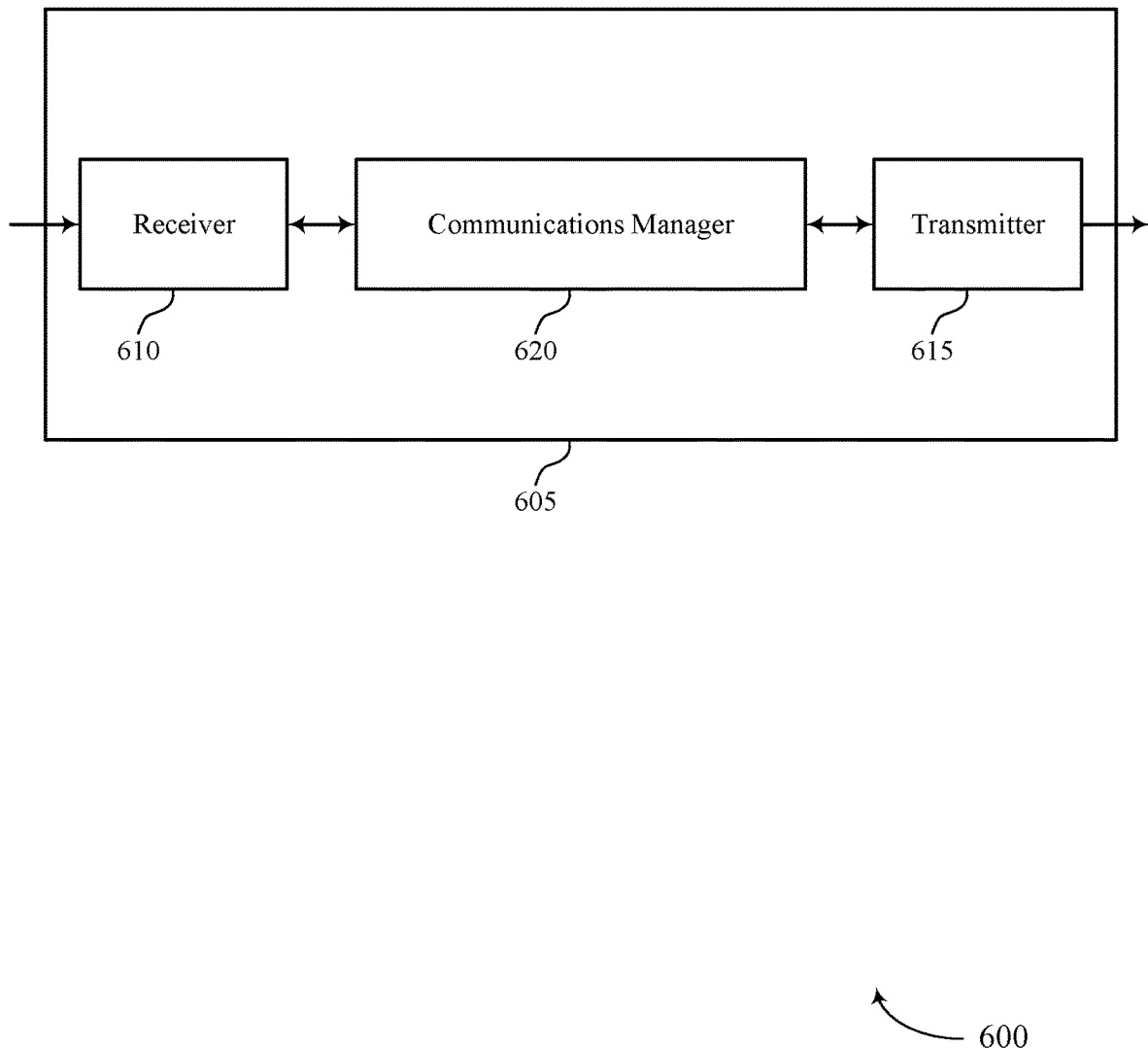
FIGS. 6 and 7 show block diagrams of devices that support cooperative radar sensing in wireless communications in accordance with one or more aspects of the present disclosure.

FIG. 6 shows a block diagram 600 of a device 605 that supports cooperative radar sensing in wireless communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to cooperative radar sensing in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to cooperative radar sensing in wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of cooperative radar sensing in wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for measuring a first set of values for one or more radar measurement parameters associated with a radar target, the first set of values including at least a first time value associated with the first set of values. The communications manager 620 may be configured as or otherwise support a means for transmitting a first report including the first set of values for the one or more radar measurement parameters associated with the radar target, an indication of the first time value associated with the first set of values, a first identifier associated with the radar target, and a second identifier associated with the first UE.

Additionally or alternatively, the communications manager 620 may support wireless communication at a first UE in accordance with examples as disclosed herein. For example, the communications manager 620 may be configured as or otherwise support a means for receiving, from a second UE, a second set of values for the one or more radar measurement parameters associated with the radar target, a third identifier associated with the second UE and an indication of a second time value. The communications manager 620 may be configured as or otherwise support a means for transmitting a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for disseminating more comprehensive radar data, resulting in more efficient utilization of communication resources.

Figure 7:
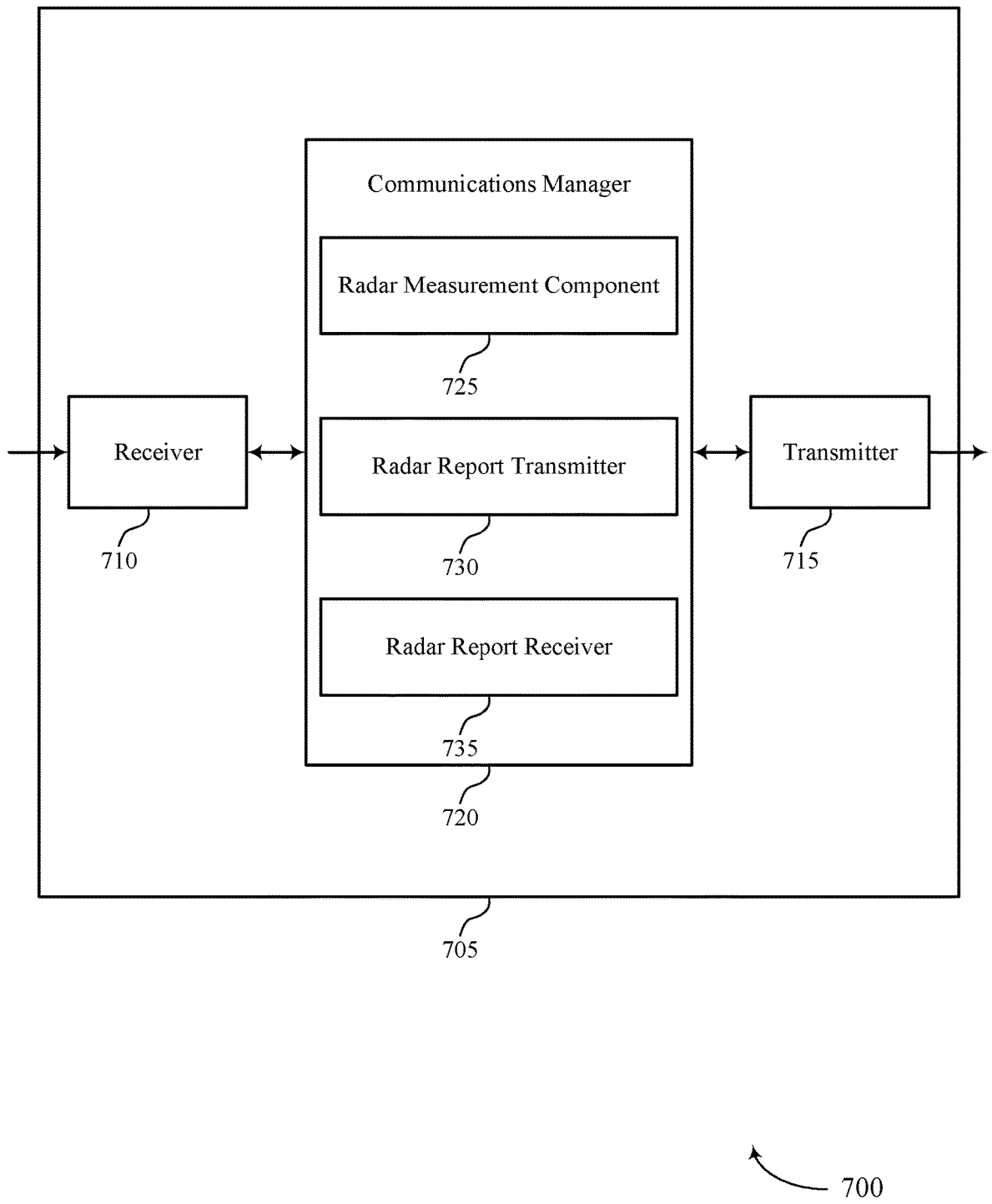

FIG. 7 shows a block diagram 700 of a device 705 that supports cooperative radar sensing in wireless communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to cooperative radar sensing in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to cooperative radar sensing in wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of cooperative radar sensing in wireless communications as described herein. For example, the communications manager 720 may include a radar measurement component 725, a radar report transmitter 730, a radar report receiver 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The radar measurement component 725 may be configured as or otherwise support a means for measuring a first set of values for one or more radar measurement parameters associated with a radar target, the first set of values including at least a time value associated with the first set of values. The radar report transmitter 730 may be configured as or otherwise support a means for transmitting a first report including the first set of values for the one or more radar measurement parameters associated with the radar target, an indication of the first time value associated with the set of values, a first identifier associated with the radar target, and a second identifier associated with the first UE.

Additionally or alternatively, the communications manager 720 may support wireless communication at a first UE in accordance with examples as disclosed herein. The radar report receiver 735 may be configured as or otherwise support a means for receiving, from a second UE, a second set of values for the one or more radar measurement parameters associated with the radar target, a third identifier associated with the second UE and an indication of a second time value. The radar report transmitter 730 may be configured as or otherwise support a means for transmitting a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

Figure 8:
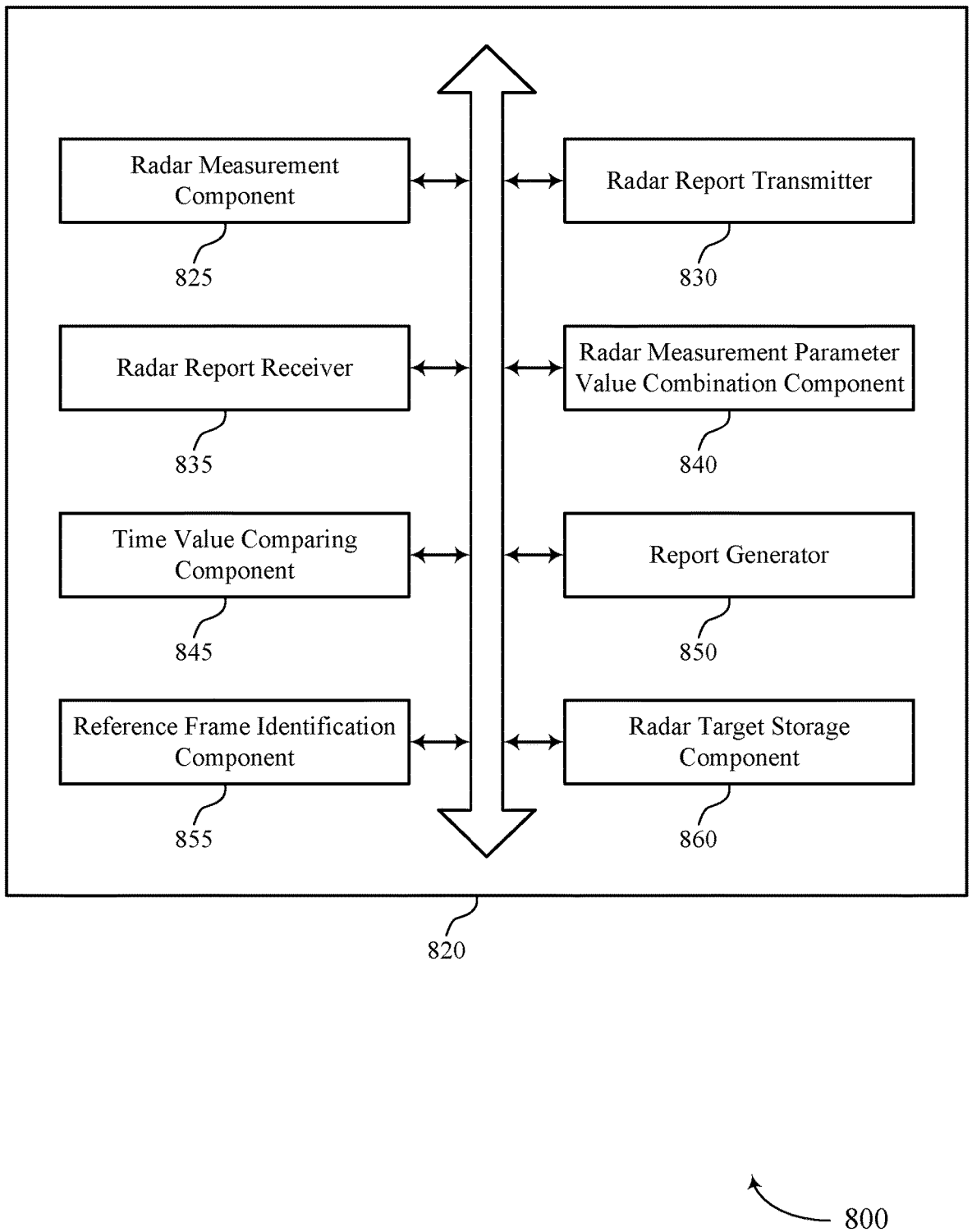
FIG. 8 shows a block diagram of a communications manager that supports cooperative radar sensing in wireless communications in accordance with one or more aspects of the present disclosure.

FIG. 8 shows a block diagram 800 of a communications manager 820 that supports cooperative radar sensing in wireless communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of cooperative radar sensing in wireless communications as described herein. For example, the communications manager 820 may include a radar measurement component 825, a radar report transmitter 830, a radar report receiver 835, a radar measurement parameter value combination component 840, a time value comparing component 845, a report generator 850, a reference frame identification component 855, a radar target storage component 860, or any combination thereof. Each of these components may communicate, directly or indirectly, with one another (e.g., via one or more buses).

The communications manager 820 may support wireless communication at a first UE in accordance with examples as disclosed herein. The radar measurement component 825 may be configured as or otherwise support a means for measuring a first set of values for one or more radar measurement parameters associated with a radar target, the first set of values including at least a first set of values and a first time value associated with the first set of values. The radar report transmitter 830 may be configured as or otherwise support a means for transmitting a first report including the first set of values for the one or more radar measurement parameters associated with the radar target, an indication of the first time value associated with the first set of values, a first identifier associated with the radar target, and a second identifier associated with the first UE.

In some examples, the radar report receiver 835 may be configured as or otherwise support a means for receiving, from a second UE, a second report including a second set of values for the one or more radar measurement parameters associated with the radar target, a third identifier associated with the second UE, and an indication of a second time value. In some examples, the radar measurement parameter value combination component 840 may be configured as or otherwise support a means for generating a combined set of values for the one or more radar measurement parameters by combining the first set of values and the second set of values.

In some examples, the radar report transmitter 830 may be configured as or otherwise support a means for transmitting the combined set of values for the one or more radar measurement parameters including the first set of values, the indication of the first time value associated with the first set of values, the second set of values, an indication of the second time value associated with the second set of values, the first identifier associated with the radar target, the second identifier associated with the first UE, and the third identifier associated with the second UE.

In some examples, the radar report receiver 835 may be configured as or otherwise support a means for receiving, from a second UE, a second report including a second set of values for the one or more radar measurement parameters associated with the radar target, a third identifier associated with the second UE, and an indication of a second time value. In some examples, the radar report receiver 835 may be configured as or otherwise support a means for receiving, from the second UE, a third report including a third set of values for the one or more radar measurement parameters associated with the radar target, the third identifier associated with the second UE, and an indication of a third time value. In some examples, the time value comparing component 845 may be configured as or otherwise support a means for determining that the second time value is earlier than the third time value. In some examples, the radar measurement parameter value combination component 840 may be configured as or otherwise support a means for generating, based on determining that the second time value is earlier than the third time value, a combined set of values for the one or more radar measurement parameters by combining the first set of values and the third set of values.

In some examples, the radar measurement component 825 may be configured as or otherwise support a means for measuring a second set of values for the one or more radar measurement parameters associated with the radar target and a second time value, where the first time value is earlier than the second time value. In some examples, the report generator 850 may be configured as or otherwise support a means for generating a second report including the second set of values for the one or more radar measurement parameters associated with the radar target, an indication of the second time value associated with the second set of values, the first identifier associated with the radar target, and the second identifier associated with the first UE.

In some examples, the radar report transmitter 830 may be configured as or otherwise support a means for transmitting the second report including the second set of values for the one or more radar measurement parameters associated with the radar target, the indication of the second time value associated with the second set of values, the first identifier associated with the radar target, and the second identifier associated with the first UE.

In some examples, the reference frame identification component 855 may be configured as or otherwise support a means for identifying a reference frame associated with the radar target, where the first set of values for the one or more radar measurement parameters is based on the reference frame.

In some examples, the reference frame identification component 855 may be configured as or otherwise support a means for identifying a first position associated with the radar target relative to a second position associated with the first UE. In some examples, the report generator 850 may be configured as or otherwise support a means for generating the first report including the first set of values for the one or more radar measurement parameters associated with the radar target, the first position associated with the radar target, the second position associated with the first UE, the indication of the first time value associated with the first set of values, the first identifier associated with the radar target, and the second identifier associated with the first UE.

In some examples, the reference frame identification component 855 may be configured as or otherwise support a means for identifying a first velocity associated with the radar target relative to a second velocity associated with the first UE. In some examples, the report generator 850 may be configured as or otherwise support a means for generating the first report including the first set of values for the one or more radar measurement parameters associated with the radar target, the first velocity associated with the radar target, the second velocity associated with the first UE, the indication of the first time value associated with the first set of values, the first identifier associated with the radar target, and the second identifier associated with the first UE.

In some examples, the radar measurement component 825 may be configured as or otherwise support a means for measuring a second set of values for the one or more radar measurement parameters associated with the second radar target and a second time value. In some examples, the report generator 850 may be configured as or otherwise support a means for generating a second report including the first set of values for the one or more radar measurement parameters associated with the radar target, the indication of the first time value associated with the first set of values, the second set of values for the one or more radar measurement parameters associated with the second radar target, an indication of the second time value associated with the second set of values, the first identifier associated with the radar target, the second identifier associated with the first UE, and a third identifier associated with the second radar target.

In some examples, the radar target storage component 860 may be configured as or otherwise support a means for storing an indication of the radar target and the second radar target based on determining the second set of values. In some examples, the radar report receiver 835 may be configured as or otherwise support a means for receiving, from a base station, an allocation of resources for the first UE to use to transmit the first report, where the resources include periodic sidelink resources, aperiodic sidelink resources, or both, for transmitting the first report.

In some examples, the radar report transmitter 830 may be configured as or otherwise support a means for transmitting a unicast sidelink message including the first report or a broadcast sidelink message including the first report. In some examples, the one or more radar measurement parameters include at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

Additionally or alternatively, the communications manager 820 may support wireless communication at a first UE in accordance with examples as disclosed herein. The radar report receiver 835 may be configured as or otherwise support a means for receiving, from a second UE, a second set of values for the one or more radar measurement parameters associated with the radar target, a third identifier associated with the second UE and an indication of a second time value. In some examples, the radar report transmitter 830 may be configured as or otherwise support a means for transmitting a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

In some examples, the radar measurement parameter value combination component 840 may be configured as or otherwise support a means for determining a combined set of values for the one or more radar measurement parameters by combining the first set of values and the second set of values. In some examples, the report generator 850 may be configured as or otherwise support a means for generating the first report including the combined set of values, the indication of the first time value associated with the first set of values, the indication of the second time value associated with the second set of values, the first identifier associated with the radar target, the second identifier associated with the first UE, and the third identifier associated with the second UE.

In some examples, the radar report receiver 835 may be configured as or otherwise support a means for receiving, from the second UE, a third set of values for the one or more radar measurement parameters associated with the radar target, the third identifier associated with the second UE, and an indication of a third time value. In some examples, the time value comparing component 845 may be configured as or otherwise support a means for determining that the second time value is earlier than the third time value. In some examples, the radar measurement parameter value combination component 840 may be configured as or otherwise support a means for generating, based on determining that the second time value is earlier than the third time value, a combined set of values for the one or more radar measurement parameters by combining the first set of values and the third set of values.

In some examples, the radar measurement component 825 may be configured as or otherwise support a means for determining, at the first UE, a third set of values for the one or more radar measurement parameters associated with the radar target and a third time value, where the first time value is earlier than the third time value. In some examples, the report generator 850 may be configured as or otherwise support a means for generating a second report including the third set of values for the one or more radar measurement parameters associated with the radar target, an indication of the third time value associated with the third set of values, the second set of values for the one or more radar measurement parameters associated with the radar target, the indication of the second time value associated with the second set of values, the first identifier associated with the radar target, the second identifier associated with the first UE, and the third identifier associated with the second UE.

In some examples, the radar report transmitter 830 may be configured as or otherwise support a means for transmitting a unicast sidelink message including the first report or a broadcast sidelink message including the first report.

In some examples, the one or more radar measurement parameters include at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

Figure 9:
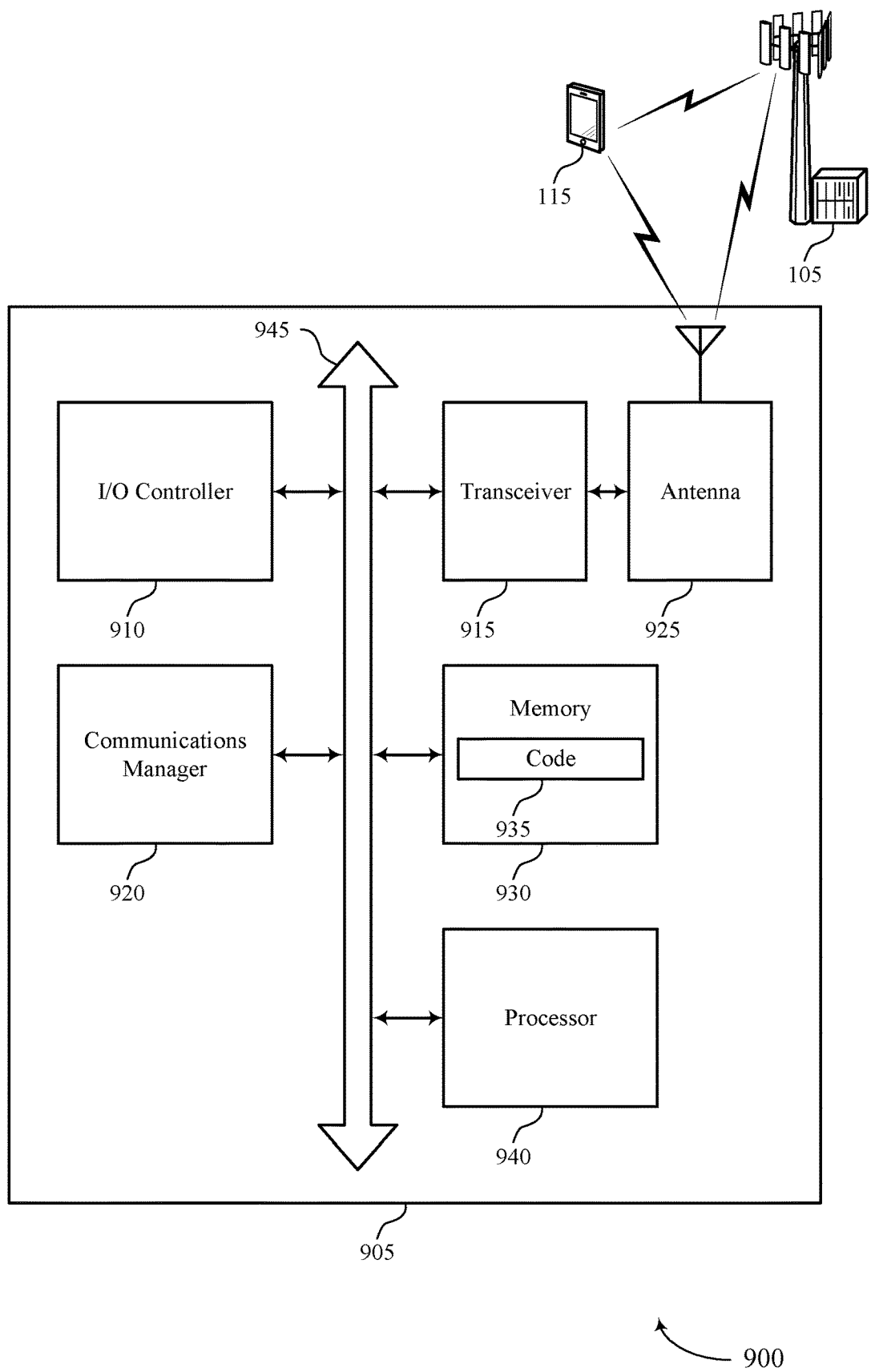
FIG. 9 shows a diagram of a system including a device that supports cooperative radar sensing in wireless communications in accordance with one or more aspects of the present disclosure.

FIG. 9 shows a diagram of a system 900 including a device 905 that supports cooperative radar sensing in wireless communications in accordance with one or more aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting cooperative radar sensing in wireless communications). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for measuring a first set of values one or more radar measurement parameters associated with a radar target, the first set of values including a first set of values and a first time value associated with the first set of values. The communications manager 920 may be configured as or otherwise support a means for transmitting a first report including the first set of values for the one or more radar measurement parameters associated with the radar target, an indication of the first time value associated with the first set of values, a first identifier associated with the radar target, and a second identifier associated with the first UE.

Additionally or alternatively, the communications manager 920 may support wireless communication at a first UE in accordance with examples as disclosed herein. For example, the communications manager 920 may be configured as or otherwise support a means for receiving, from a second UE, a second set of values for the one or more radar measurement parameters associated with the radar target, a third identifier associated with the second UE and an indication of a second time value. The communications manager 920 may be configured as or otherwise support a means for transmitting a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

By including or configuring the communications manager 920 in accordance with examples as described herein, the device 905 may support techniques for sharing more comprehensive radar data, resulting in more accurate target determination, less traffic accidents, and enhanced system efficiency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of cooperative radar sensing in wireless communications as described herein, or the processor 940 and the memory 930 may be otherwise configured to perform or support such operations.

Figure 10:
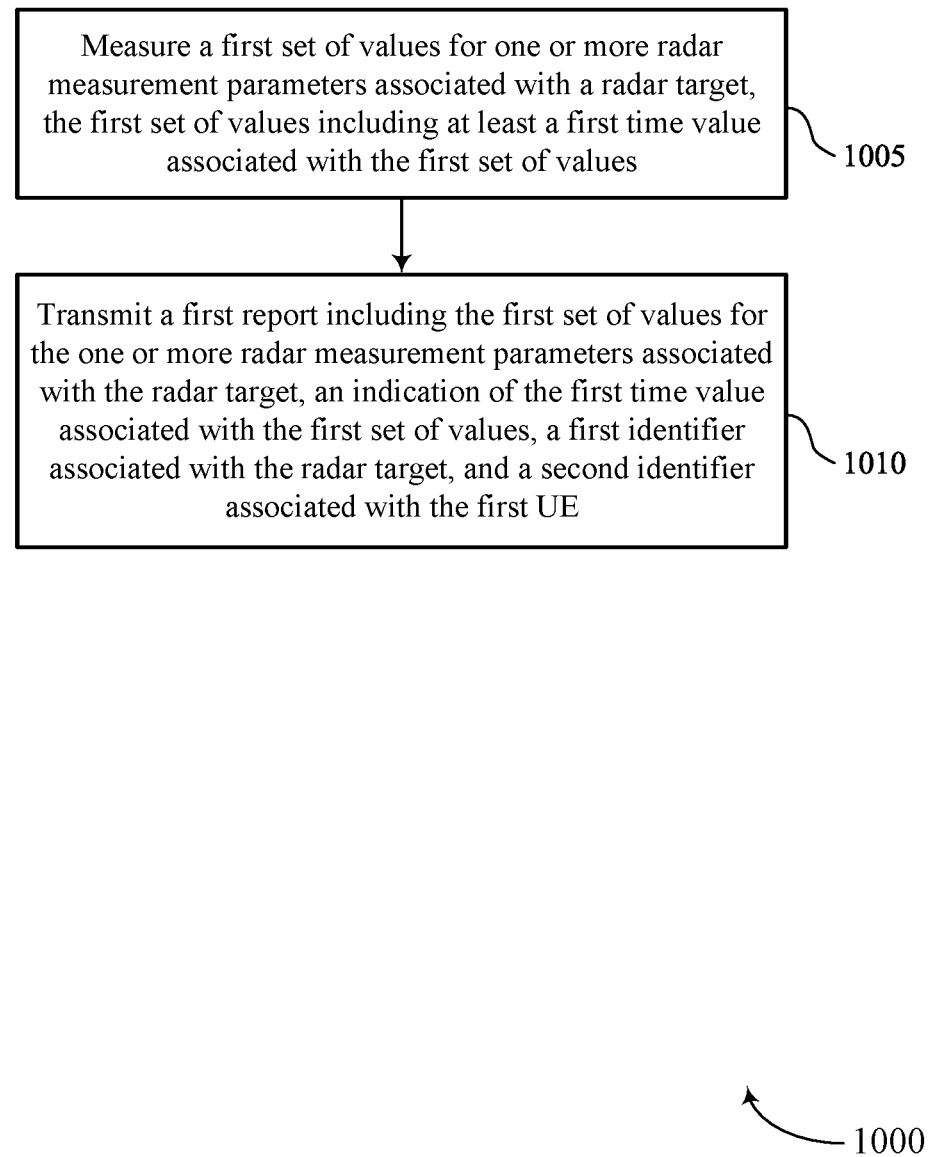
FIGS. 10 through 13 show flowcharts illustrating methods that support cooperative radar sensing in wireless communications in accordance with one or more aspects of the present disclosure.

FIG. 10 shows a flowchart illustrating a method 1000 that supports cooperative radar sensing in wireless communications in accordance with one or more aspects of the present disclosure. The operations of the method 1000 may be implemented by a first UE or its components as described herein. For example, the operations of the method 1000 may be performed by a UE 115 as described with reference to FIGS. 1 through 9. In some examples, a first UE may execute a set of instructions to control the functional elements of the first UE to perform the described functions.

Additionally or alternatively, the first UE may perform aspects of the described functions using special-purpose hardware.

At 1005, the method may include measuring a first set of values for one or more radar measurement parameters associated with a radar target, the first set of values including at least a first time value associated with the first set of values. The operations of 1005 may be performed in accordance with examples as disclosed herein. In some examples, aspects of the operations of 1005 may be performed by a radar measurement component 825 as described with reference to FIG. 8.

At 1010, the method may include transmitting a first report including the first set of values for the one or more radar measurement parameters associated with the radar target, an indication of the first time value associated with the first set of values, a first identifier associated with the radar target, and a second identifier associated with the first UE. The operations of 1010 may be performed in accordance with examples as disclosed herein. In some examples, aspects of the operations of 1010 may be performed by a radar report transmitter 830 as described with reference to FIG. 8.

Figure 11:
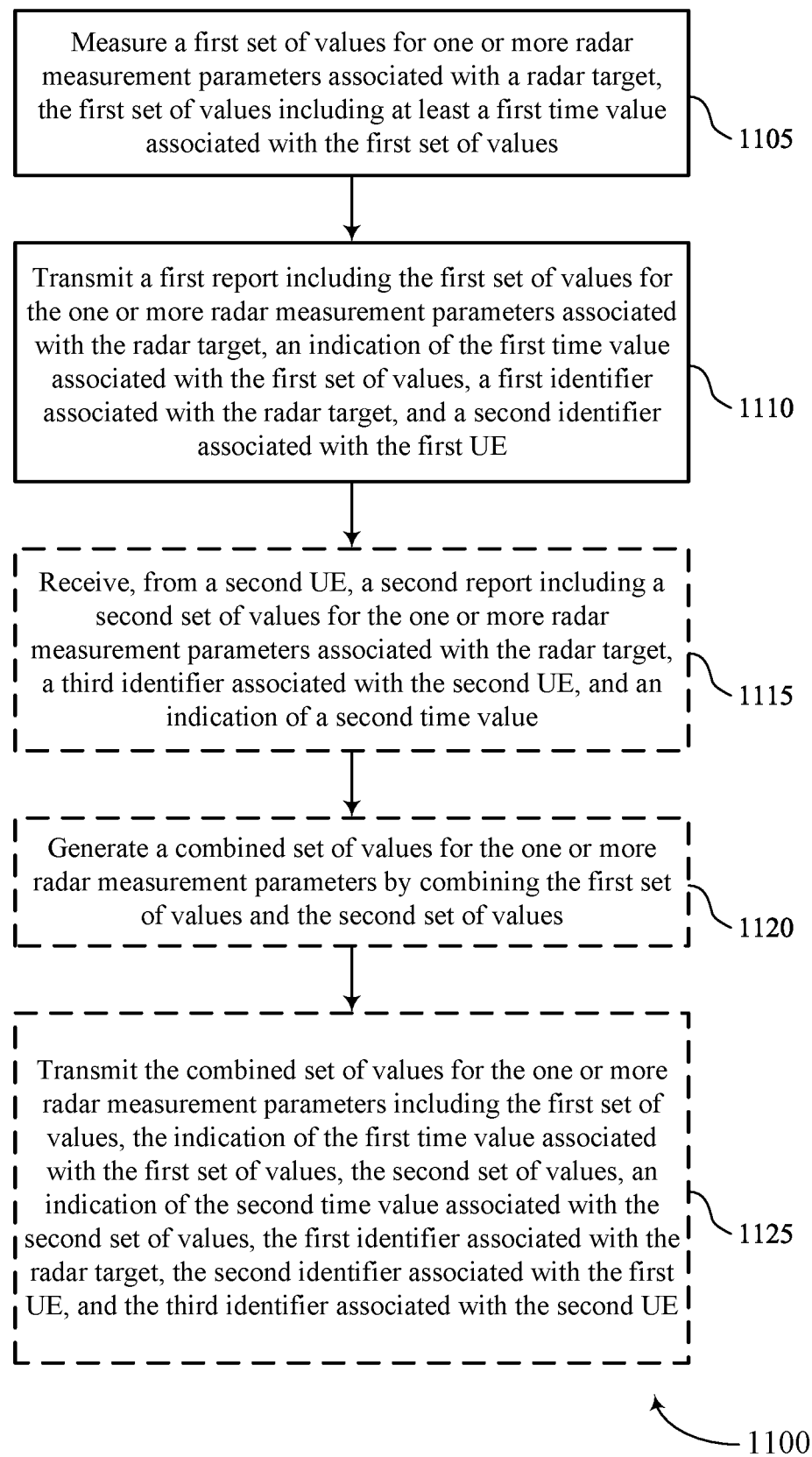

FIG. 11 shows a flowchart illustrating a method 1100 that supports cooperative radar sensing in wireless communications in accordance with one or more aspects of the present disclosure. The operations of the method 1100 may be implemented by a first UE or its components as described herein. For example, the operations of the method 1100 may be performed by a UE 115 as described with reference to FIGS. 1 through 9. In some examples, a first UE may execute a set of instructions to control the functional elements of the first UE to perform the described functions. Additionally or alternatively, the first UE may perform aspects of the described functions using special-purpose hardware.

At 1105, the method may include measuring a first set of values for one or more radar measurement parameters associated with a radar target, the first set of values including at least a first time value associated with the first set of values. The operations of 1105 may be performed in accordance with examples as disclosed herein. In some examples, aspects of the operations of 1105 may be performed by a radar measurement component 825 as described with reference to FIG. 8.

At 1110, the method may include transmitting a first report including the first set of values for the one or more radar measurement parameters associated with the radar target, an indication of the first time value associated with the first set of values, a first identifier associated with the radar target, and a second identifier associated with the first UE. The operations of 1110 may be performed in accordance with examples as disclosed herein. In some examples, aspects of the operations of 1110 may be performed by a radar report transmitter 830 as described with reference to FIG. 8.

At 1115, the method may optionally include receiving, from a second UE, a second report including a second set of values for the one or more radar measurement parameters associated with the radar target, a third identifier associated with the second UE, and an indication of a second time value. The operations of 1115 may be performed in accordance with examples as disclosed herein. In some examples, aspects of the operations of 1115 may be performed by a radar report receiver 835 as described with reference to FIG. 8.

At 1120, the method may optionally include generating a combined set of values for the one or more radar measurement parameters by combining the first set of values and the second set of values. The operations of 1120 may be performed in accordance with examples as disclosed herein. In some examples, aspects of the operations of 1120 may be performed by a radar measurement parameter value combination component 840 as described with reference to FIG. 8.

At 1125, the method may optionally include transmitting the combined set of values for the one or more radar measurement parameters including the first set of values, the indication of the first time value associated with the first set of values, the second set of values, an indication of the second time value associated with the second set of values, the first identifier associated with the radar target, the second identifier associated with the first UE, and the third identifier associated with the second UE. The operations of 1125 may be performed in accordance with examples as disclosed herein. In some examples, aspects of the operations of 1125 may be performed by a radar report transmitter 830 as described with reference to FIG. 8.

Figure 12:
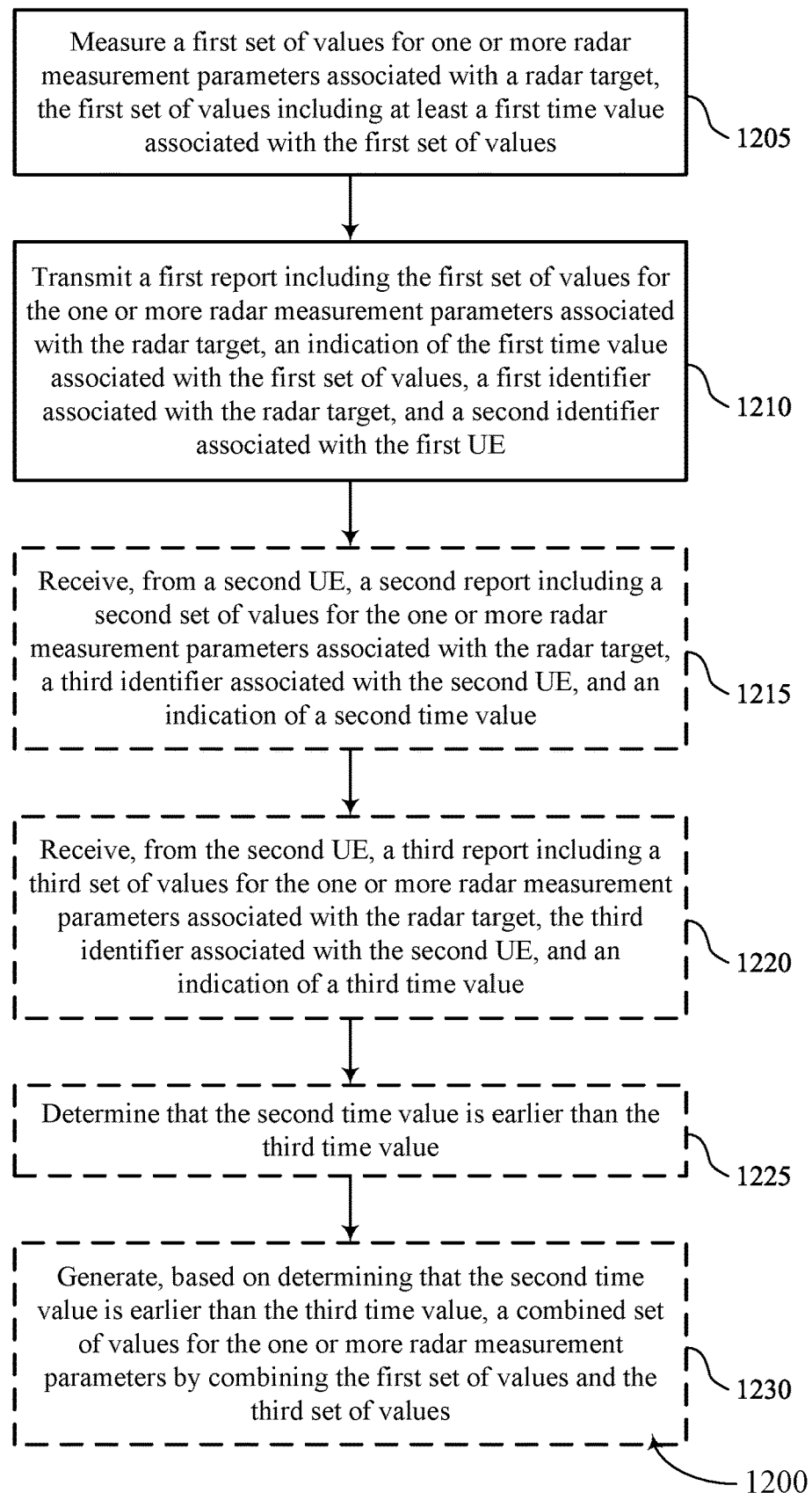

FIG. 12 shows a flowchart illustrating a method 1200 that supports cooperative radar sensing in wireless communications in accordance with one or more aspects of the present disclosure. The operations of the method 1200 may be implemented by a first UE or its components as described herein. For example, the operations of the method 1200 may be performed by a UE 115 as described with reference to FIGS. 1 through 9. In some examples, a first UE may execute a set of instructions to control the functional elements of the first UE to perform the described functions. Additionally or alternatively, the first UE may perform aspects of the described functions using special-purpose hardware.

At 1205, the method may include measuring a first set of values for one or more radar measurement parameters associated with a radar target, the first set of values including at least a first time value associated with the first set of values. The operations of 1205 may be performed in accordance with examples as disclosed herein. In some examples, aspects of the operations of 1205 may be performed by a radar measurement component 825 as described with reference to FIG. 8.

At 1210, the method may include transmitting a first report including the first set of values for the one or more radar measurement parameters associated with the radar target, an indication of the first time value associated with the first set of values, a first identifier associated with the radar target, and a second identifier associated with the first UE. The operations of 1210 may be performed in accordance with examples as disclosed herein. In some examples, aspects of the operations of 1210 may be performed by a radar report transmitter 830 as described with reference to FIG. 8.

At 1215, the method may optionally include receiving, from a second UE, a second report including a second set of values for the one or more radar measurement parameters associated with the radar target, a third identifier associated with the second UE, and an indication of a second time value. The operations of 1215 may be performed in accordance with examples as disclosed herein. In some examples, aspects of the operations of 1215 may be performed by a radar report receiver 835 as described with reference to FIG. 8.

At 1220, the method may optionally include receiving, from the second UE, a third report including a third set of values for the one or more radar measurement parameters associated with the radar target, the third identifier associated with the second UE, and an indication of a third time value. The operations of 1220 may be performed in accordance with examples as disclosed herein. In some examples, aspects of the operations of 1220 may be performed by a radar report receiver 835 as described with reference to FIG. 8.

At 1225, the method may optionally include determining that the second time value is earlier than the third time value. The operations of 1225 may be performed in accordance with examples as disclosed herein. In some examples, aspects of the operations of 1225 may be performed by a time value comparing component 845 as described with reference to FIG. 8.

At 1230, the method may optionally include generating, based on determining that the second time value is earlier than the third time value, a combined set of values for the one or more radar measurement parameters by combining the first set of values and the third set of values. The operations of 1230 may be performed in accordance with examples as disclosed herein. In some examples, aspects of the operations of 1230 may be performed by a radar measurement parameter value combination component 840 as described with reference to FIG. 8.

Figure 13:
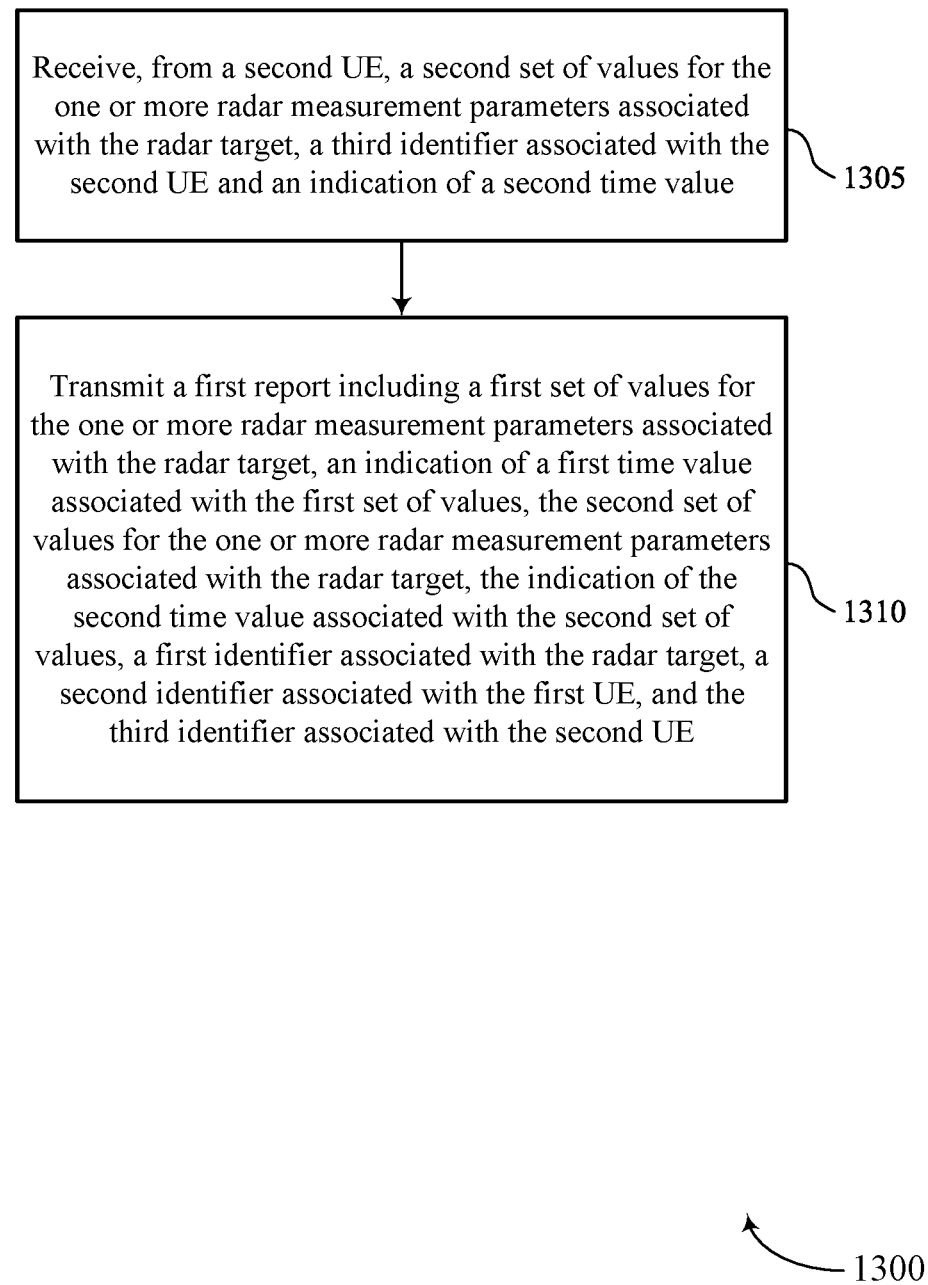

FIG. 13 shows a flowchart illustrating a method 1300 that supports cooperative radar sensing in wireless communications in accordance with one or more aspects of the present disclosure. The operations of the method 1300 may be implemented by a first UE or its components as described herein. For example, the operations of the method 1300 may be performed by a UE 115 as described with reference to FIGS. 1 through 9. In some examples, a first UE may execute a set of instructions to control the functional elements of the first UE to perform the described functions. Additionally or alternatively, the first UE may perform aspects of the described functions using special-purpose hardware.

At 1305, the method may include receiving, from a second UE, a second set of values for the one or more radar measurement parameters associated with the radar target, a third identifier associated with the second UE and an indication of a second time value. The operations of 1305 may be performed in accordance with examples as disclosed herein. In some examples, aspects of the operations of 1305 may be performed by a radar report receiver 835 as described with reference to FIG. 8.

At 1310, the method may include transmitting a first report including a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE. The operations of 1310 may be performed in accordance with examples as disclosed herein. In some examples, aspects of the operations of 1310 may be performed by a radar report transmitter 830 as described with reference to FIG. 8.

The following provides an overview of aspects of the present disclosure:

Aspect 1: A method for wireless communication at a first UE, comprising: measuring a first set of values for one or more radar measurement parameters associated with a radar target, the first set of values comprising at least a first time value associated with the first set of values; and transmitting a first report comprising the first set of values for the one or more radar measurement parameters associated with the radar target, an indication of the first time value associated with the first set of values, a first identifier associated with the radar target, and a second identifier associated with the first UE.

Aspect 2: The method of aspect 1, further comprising: receiving, from a second UE, a second report comprising a second set of values for the one or more radar measurement parameters associated with the radar target, a third identifier associated with the second UE, and an indication of a second time value; and generating a combined set of values for the one or more radar measurement parameters by combining the first set of values and the second set of values.

Aspect 3: The method of aspect 2, further comprising: transmitting the combined set of values for the one or more radar measurement parameters comprising the first set of values, the indication of the first time value associated with the first set of values, the second set of values, an indication of the second time value associated with the second set of values, the first identifier associated with the radar target, the second identifier associated with the first UE, and the third identifier associated with the second UE.

Aspect 4: The method of any of aspects 1 through 3, further comprising: receiving, from a second UE, a second report comprising a second set of values for the one or more radar measurement parameters associated with the radar target, a third identifier associated with the second UE, and an indication of a second time value; receiving, from the second UE, a third report comprising a third set of values for the one or more radar measurement parameters associated with the radar target, the third identifier associated with the second UE, and an indication of a third time value; determining that the second time value is earlier than the third time value; and generating, based at least in part on determining that the second time value is earlier than the third time value, a combined set of values for the one or more radar measurement parameters by combining the first set of values and the third set of values.

Aspect 5: The method of any of aspects 1 through 4, further comprising: measuring a second set of values for the one or more radar measurement parameters associated with the radar target and a second time value, wherein the first time value is earlier than the second time value; and generating a second report comprising the second set of values for the one or more radar measurement parameters associated with the radar target, an indication of the second time value associated with the second set of values, the first identifier associated with the radar target, and the second identifier associated with the first UE.

Aspect 6: The method of aspect 5, further comprising: transmitting the second report comprising the second set of values for the one or more radar measurement parameters associated with the radar target, the indication of the second time value associated with the second set of values, the first identifier associated with the radar target, and the second identifier associated with the first UE.

Aspect 7: The method of any of aspects 1 through 6, further comprising: identifying a reference frame associated with the radar target, wherein the first set of values for the one or more radar measurement parameters is based at least in part on the reference frame.

Aspect 8: The method of any of aspects 1 through 7, further comprising: identifying a first position associated with the radar target relative to a second position associated with the first UE; and generating the first report comprising the first set of values for the one or more radar measurement parameters associated with the radar target, the first position associated with the radar target, the second position associated with the first UE, the indication of the first time value associated with the first set of values, the first identifier associated with the radar target, and the second identifier associated with the first UE.

Aspect 9: The method of any of aspects 1 through 8, further comprising: identifying a first velocity associated with the radar target relative to a second velocity associated with the first UE; and generating the first report comprising the first set of values for the one or more radar measurement parameters associated with the radar target, the first velocity associated with the radar target, the second velocity associated with the first UE, the indication of the first time value associated with the first set of values, the first identifier associated with the radar target, and the second identifier associated with the first UE.

Aspect 10: The method of any of aspects 1 through 9, further comprising: measuring a second set of values for the one or more radar measurement parameters associated with a second radar target and a second time value; and generating a second report comprising the first set of values for the one or more radar measurement parameters associated with the radar target, the indication of the first time value associated with the first set of values, the second set of values for the one or more radar measurement parameters associated with the second radar target, an indication of the second time value associated with the second set of values, the first identifier associated with the radar target, the second identifier associated with the first UE, and a third identifier associated with the second radar target.

Aspect 11: The method of aspect 10, further comprising: storing an indication of the radar target and the second radar target based at least in part on determining the second set of values.

Aspect 12: The method of any of aspects 1 through 11, further comprising: receiving, from a base station, an allocation of resources for the first UE to use to transmit the first report, wherein the resources comprise periodic sidelink resources, aperiodic sidelink resources, or both, for transmitting the first report.

Aspect 13: The method of any of aspects 1 through 12, the transmitting comprising: transmitting a unicast sidelink message comprising the first report or a broadcast sidelink message comprising the first report.

Aspect 14: The method of any of aspects 1 through 13, wherein the one or more radar measurement parameters comprise at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

Aspect 15: A method for wireless communication at a first UE, comprising: receiving, from a second UE, a second set of values for the one or more radar measurement parameters associated with a radar target, a third identifier associated with the second UE and an indication of a second time value; and transmitting a first report comprising a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

Aspect 16: The method of aspect 15, further comprising: determining a combined set of values for the one or more radar measurement parameters by combining the first set of values and the second set of values; and generating the first report comprising the combined set of values, the indication of the first time value associated with the first set of values, the indication of the second time value associated with the second set of values, the first identifier associated with the radar target, the second identifier associated with the first UE, and the third identifier associated with the second UE.

Aspect 17: The method of any of aspects 15 through 16, further comprising: receiving, from the second UE, a third set of values for the one or more radar measurement parameters associated with the radar target, the third identifier associated with the second UE, and an indication of a third time value; determining that the second time value is earlier than the third time value; and generating, based at least in part on determining that the second time value is earlier than the third time value, a combined set of values for the one or more radar measurement parameters by combining the first set of values and the third set of values.

Aspect 18: The method of any of aspects 15 through 17, further comprising: determining, at the first UE, a third set of values for the one or more radar measurement parameters associated with the radar target and a third time value, wherein the first time value is earlier than the third time value; and generating a second report comprising the third set of values for the one or more radar measurement parameters associated with the radar target, an indication of the third time value associated with the third set of values, the second set of values for the one or more radar measurement parameters associated with the radar target, the indication of the second time value associated with the second set of values, the first identifier associated with the radar target, the second identifier associated with the first UE, and the third identifier associated with the second UE.

Aspect 19: The method of any of aspects 15 through 18, the transmitting comprising: transmitting a unicast sidelink message comprising the first report or a broadcast sidelink message comprising the first report.

Aspect 20: The method of any of aspects 15 through 19, wherein the one or more radar measurement parameters comprise at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

Aspect 21: An apparatus for wireless communication at a first UE, comprising a processor; memory coupled with the processor; and instructions stored in the memory and executable by the processor to cause the apparatus to perform a method of any of aspects 1 through 14.

Aspect 22: An apparatus for wireless communication at a first UE, comprising at least one means for performing a method of any of aspects 1 through 14.

Aspect 23: A non-transitory computer-readable medium storing code for wireless communication at a first UE, the code comprising instructions executable by a processor to perform a method of any of aspects 1 through 14.

Aspect 24: An apparatus for wireless communication at a first UE, comprising a processor; memory coupled with the processor; and instructions stored in the memory and executable by the processor to cause the apparatus to perform a method of any of aspects through.

Aspect 25: An apparatus for wireless communication at a first UE, comprising at least one means for performing a method of any of aspects 15 through 20.

Aspect 26: A non-transitory computer-readable medium storing code for wireless communication at a first UE, the code comprising instructions executable by a processor to perform a method of any of aspects 15 through 20.

It should be noted that the methods described herein describe possible implementations, and that the operations and the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
measuring a first set of values for one or more radar measurement parameters associated with a radar target, the first set of values comprising at least a first time value associated with the first set of values; and
transmitting a first report comprising the first set of values for the one or more radar measurement parameters associated with the radar target, an indication of the first time value associated with the first set of values, a first identifier associated with the radar target, and a second identifier associated with the first UE.

2. The method of claim 1, further comprising:
receiving, from a second UE, a second report comprising a second set of values for the one or more radar measurement parameters associated with the radar target, a third identifier associated with the second UE, and an indication of a second time value; and
generating a combined set of values for the one or more radar measurement parameters by combining the first set of values and the second set of values.

3. The method of claim 2, further comprising:
transmitting the combined set of values for the one or more radar measurement parameters comprising the first set of values, the indication of the first time value associated with the first set of values, the second set of values, an indication of the second time value associated with the second set of values, the first identifier associated with the radar target, the second identifier associated with the first UE, and the third identifier associated with the second UE.

4. The method of claim 1, further comprising:
receiving, from a second UE, a second report comprising a second set of values for the one or more radar measurement parameters associated with the radar target, a third identifier associated with the second UE, and an indication of a second time value;
receiving, from the second UE, a third report comprising a third set of values for the one or more radar measurement parameters associated with the radar target, the third identifier associated with the second UE, and an indication of a third time value;
determining that the second time value is earlier than the third time value; and
generating, based at least in part on determining that the second time value is earlier than the third time value, a combined set of values for the one or more radar measurement parameters by combining the first set of values and the third set of values.

5. The method of claim 1, further comprising:
measuring a second set of values for the one or more radar measurement parameters associated with the radar target and a second time value, wherein the first time value is earlier than the second time value; and
generating a second report comprising the second set of values for the one or more radar measurement parameters associated with the radar target, an indication of the second time value associated with the second set of values, the first identifier associated with the radar target, and the second identifier associated with the first UE.

6. The method of claim 5, further comprising:
transmitting the second report comprising the second set of values for the one or more radar measurement parameters associated with the radar target, the indication of the second time value associated with the second set of values, the first identifier associated with the radar target, and the second identifier associated with the first UE.

7. The method of claim 1, further comprising:
identifying a reference frame associated with the radar target, wherein the first set of values for the one or more radar measurement parameters is based at least in part on the reference frame.

8. The method of claim 1, further comprising:
identifying a first position associated with the radar target relative to a second position associated with the first UE; and
generating the first report comprising the first set of values for the one or more radar measurement parameters associated with the radar target, the first position associated with the radar target, the second position associated with the first UE, the indication of the first time value associated with the first set of values, the first identifier associated with the radar target, and the second identifier associated with the first UE.

9. The method of claim 1, further comprising:
identifying a first velocity associated with the radar target relative to a second velocity associated with the first UE; and
generating the first report comprising the first set of values for the one or more radar measurement parameters associated with the radar target, the first velocity associated with the radar target, the second velocity associated with the first UE, the indication of the first time value associated with the first set of values, the first identifier associated with the radar target, and the second identifier associated with the first UE.

10. The method of claim 1, further comprising:
measuring a second set of values for the one or more radar measurement parameters associated with a second radar target and a second time value; and
generating a second report comprising the first set of values for the one or more radar measurement parameters associated with the radar target, the indication of the first time value associated with the first set of values, the second set of values for the one or more radar measurement parameters associated with the second radar target, an indication of the second time value associated with the second set of values, the first identifier associated with the radar target, the second identifier associated with the first UE, and a third identifier associated with the second radar target.

11. The method of claim 10, further comprising:
storing an indication of the radar target and the second radar target based at least in part on determining the second set of values.

12. The method of claim 1, further comprising:
receiving, from a base station, an allocation of resources for the first UE to use to transmit the first report, wherein the resources comprise periodic sidelink resources, aperiodic sidelink resources, or both, for transmitting the first report.

13. The method of claim 1, the transmitting comprising:
transmitting a unicast sidelink message comprising the first report or a broadcast sidelink message comprising the first report.

14. The method of claim 1, wherein the one or more radar measurement parameters comprise at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

15. A method for wireless communication at a first user equipment (UE), comprising:
receiving, from a second UE, a second set of values for one or more radar measurement parameters associated with a radar target, a third identifier associated with the second UE and an indication of a second time value; and
transmitting a first report comprising a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

16. The method of claim 15, further comprising:
determining a combined set of values for the one or more radar measurement parameters by combining the first set of values and the second set of values; and
generating the first report comprising the combined set of values, the indication of the first time value associated with the first set of values, the indication of the second time value associated with the second set of values, the first identifier associated with the radar target, the second identifier associated with the first UE, and the third identifier associated with the second UE.

17. The method of claim 15, further comprising:
receiving, from the second UE, a third set of values for the one or more radar measurement parameters associated with the radar target, the third identifier associated with the second UE, and an indication of a third time value;
determining that the second time value is earlier than the third time value; and
generating, based at least in part on determining that the second time value is earlier than the third time value, a combined set of values for the one or more radar measurement parameters by combining the first set of values and the third set of values.

18. The method of claim 15, further comprising:
determining, at the first UE, a third set of values for the one or more radar measurement parameters associated with the radar target and a third time value, wherein the first time value is earlier than the third time value; and
generating a second report comprising the third set of values for the one or more radar measurement parameters associated with the radar target, an indication of the third time value associated with the third set of values, the second set of values for the one or more radar measurement parameters associated with the radar target, the indication of the second time value associated with the second set of values, the first identifier associated with the radar target, the second identifier associated with the first UE, and the third identifier associated with the second UE.

19. The method of claim 15, the transmitting comprising:
transmitting a unicast sidelink message comprising the first report or a broadcast sidelink message comprising the first report.

20. The method of claim 15, wherein the one or more radar measurement parameters comprise at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

21. An apparatus for wireless communication at a first user equipment (UE), comprising:
one or more memories; and
one or more processors coupled with the one or more memories and individually or collectively configured to cause the first UE to:
measure a first set of values for one or more radar measurement parameters associated with a radar target, the first set of values comprising at least a first time value associated with the first set of values; and
transmit a first report comprising the first set of values for the one or more radar measurement parameters associated with the radar target, an indication of the first time value associated with the first set of values, a first identifier associated with the radar target, and a second identifier associated with the first UE.

22. The apparatus of claim 21, wherein the one or more processors are individually or collectively configured to cause the first UE to:
receive, from a second UE, a second report comprising a second set of values for the one or more radar measurement parameters associated with the radar target, a third identifier associated with the second UE, and an indication of a second time value; and
generate a combined set of values for the one or more radar measurement parameters based at least in part on the first set of values and the second set of values.

23. The apparatus of claim 22, further comprising an antenna array, wherein the one or more processors, and the antenna array are individually or collectively configured to cause the first UE to:
transmit the combined set of values for the one or more radar measurement parameters comprising the first set of values, the indication of the first time value associated with the first set of values, the second set of values, an indication of the second time value associated with the second set of values, the first identifier associated with the radar target, the second identifier associated with the first UE, and the third identifier associated with the second UE.

24. The apparatus of claim 21, wherein the one or more processors are individually or collectively configured to cause the first UE to:
receive, from a second UE, a second report comprising a second set of values for the one or more radar measurement parameters associated with the radar target, a third identifier associated with the second UE, and an indication of a second time value;
receive, from the second UE, a third report comprising a third set of values for the one or more radar measurement parameters associated with the radar target, the third identifier associated with the second UE, and an indication of a third time value;
determine that the second time value is earlier than the third time value; and
generate, based at least in part on the second time value being earlier than the third time value, a combined set of values for the one or more radar measurement parameters based at least in part on the first set of values and the third set of values.

25. The apparatus of claim 21, wherein the one or more processors are individually or collectively configured to cause the first UE to:
measure a second set of values for the one or more radar measurement parameters associated with the radar target and a second time value, wherein the first time value is earlier than the second time value; and
generate a second report comprising the second set of values for the one or more radar measurement parameters associated with the radar target, an indication of the second time value associated with the second set of values, the first identifier associated with the radar target, and the second identifier associated with the first UE.

26. The apparatus of claim 25, wherein the one or more processors are individually or collectively configured to cause the first UE to:
transmit the second report comprising the second set of values for the one or more radar measurement parameters associated with the radar target, the indication of the second time value associated with the second set of values, the first identifier associated with the radar target, and the second identifier associated with the first UE.

27. The apparatus of claim 21, wherein the one or more processors are individually or collectively configured to cause the first UE to:
identify a reference frame associated with the radar target, wherein the first set of values for the one or more radar measurement parameters is based at least in part on the reference frame.

28. The apparatus of claim 21, wherein the one or more processors are individually or collectively configured to cause the first UE to:
identify a first position associated with the radar target relative to a second position associated with the first UE; and
generate the first report comprising the first set of values for the one or more radar measurement parameters associated with the radar target, the first position associated with the radar target, the second position associated with the first UE, the indication of the first time value associated with the first set of values, the first identifier associated with the radar target, and the second identifier associated with the first UE.

29. The apparatus of claim 21, wherein the one or more processors are individually or collectively configured to cause the first UE to:
identify a first velocity associated with the radar target relative to a second velocity associated with the first UE; and
generate the first report comprising the first set of values for the one or more radar measurement parameters associated with the radar target, the first velocity associated with the radar target, the second velocity associated with the first UE, the indication of the first time value associated with the first set of values, the first identifier associated with the radar target, and the second identifier associated with the first UE.

30. The apparatus of claim 21, wherein the one or more processors are individually or collectively configured to cause the first UE to:
measure a second set of values for the one or more radar measurement parameters associated with a second radar target and a second time value; and
generate a second report comprising the first set of values for the one or more radar measurement parameters associated with the radar target, the indication of the first time value associated with the first set of values, the second set of values for the one or more radar measurement parameters associated with the second radar target, an indication of the second time value associated with the second set of values, the first identifier associated with the radar target, the second identifier associated with the first UE, and a third identifier associated with the second radar target.

31. The apparatus of claim 30, wherein the one or more processors are individually or collectively configured to cause the first UE to:
store an indication of the radar target and the second radar target based at least in part on the second set of values.

32. The apparatus of claim 21, wherein the one or more processors are individually or collectively configured to cause the first UE to:
receive, from a base station, an allocation of resources for the first UE to use to transmit the first report, wherein the resources comprise periodic sidelink resources, aperiodic sidelink resources, or both, to transmit the first report.

33. The apparatus of claim 21, wherein, to transmit, the one or more processors are individually or collectively configured to cause the first UE to:
transmit a unicast sidelink message comprising the first report or a broadcast sidelink message comprising the first report.

34. The apparatus of claim 21, wherein the one or more radar measurement parameters comprise at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

35. An apparatus for wireless communication at a first user equipment (UE), comprising:
one or more memories; and
one or more processors coupled with the one or more memories and individually or collectively configured to cause the first UE to:
receive, from a second UE, a second set of values for one or more radar measurement parameters associated with a radar target, a third identifier associated with the second UE and an indication of a second time value; and
transmit a first report comprising a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

36. The apparatus of claim 35, wherein the one or more processors are individually or collectively configured to cause the first UE to:
   determine a combined set of values for the one or more radar measurement parameters based at least in part on the first set of values and the second set of values; and
   generate the first report comprising the combined set of values, the indication of the first time value associated with the first set of values, the indication of the second time value associated with the second set of values, the first identifier associated with the radar target, the second identifier associated with the first UE, and the third identifier associated with the second UE.

37. The apparatus of claim 35, wherein the one or more processors are individually or collectively configured to cause the first UE to:
   receive, from the second UE, a third set of values for the one or more radar measurement parameters associated with the radar target, the third identifier associated with the second UE, and an indication of a third time value;
   determine that the second time value is earlier than the third time value; and
   generate, based at least in part on the second time value being earlier than the third time value, a combined set of values for the one or more radar measurement parameters based at least in part on the first set of values and the third set of values.

38. The apparatus of claim 35, wherein the one or more processors are individually or collectively configured to cause the first UE to:
   determine, at the first UE, a third set of values for the one or more radar measurement parameters associated with the radar target and a third time value, wherein the first time value is earlier than the third time value; and
   generate a second report comprising the third set of values for the one or more radar measurement parameters associated with the radar target, an indication of the third time value associated with the third set of values, the second set of values for the one or more radar measurement parameters associated with the radar target, the indication of the second time value associated with the second set of values, the first identifier associated with the radar target, the second identifier associated with the first UE, and the third identifier associated with the second UE.

39. The apparatus of claim 35, further comprising an antenna array, wherein, to transmit, the one or more processors, and the antenna array are individually or collectively configured to cause the first UE to:
   transmit a unicast sidelink message comprising the first report or a broadcast sidelink message comprising the first report.

40. The apparatus of claim 35, wherein the one or more radar measurement parameters comprise at least one of a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

41. A non-transitory computer-readable medium storing code for wireless communications by a first user equipment (UE), the code comprising instructions executable by one or more processors to:
   measure a first set of values for one or more radar measurement parameters associated with a radar target, the first set of values comprising at least a first time value associated with the first set of values; and
   transmit a first report comprising the first set of values for the one or more radar measurement parameters associated with the radar target, an indication of the first time value associated with the first set of values, a first identifier associated with the radar target, and a second identifier associated with the first UE.

42. The non-transitory computer-readable medium of claim 41, the code further comprising instructions executable by the one or more processors to:
   receive, from a second UE, a second report comprising a second set of values for the one or more radar measurement parameters associated with the radar target, a third identifier associated with the second UE, and an indication of a second time value; and
   generate a combined set of values for the one or more radar measurement parameters by combining the first set of values and the second set of values.

43. The non-transitory computer-readable medium of claim 42, the code further comprising instructions executable by the one or more processors to:
   transmit the combined set of values for the one or more radar measurement parameters comprising the first set of values, the indication of the first time value associated with the first set of values, the second set of values, an indication of the second time value associated with the second set of values, the first identifier associated with the radar target, the second identifier associated with the first UE, and the third identifier associated with the second UE.

44. The non-transitory computer-readable medium of claim 41, the code further comprising instructions executable by the one or more processors to:
   receive, from a second UE, a second report comprising a second set of values for the one or more radar measurement parameters associated with the radar target, a third identifier associated with the second UE, and an indication of a second time value;
   receive, from the second UE, a third report comprising a third set of values for the one or more radar measurement parameters associated with the radar target, the third identifier associated with the second UE, and an indication of a third time value;
   determine that the second time value is earlier than the third time value; and
   generate, based at least in part on determining that the second time value is earlier than the third time value, a combined set of values for the one or more radar measurement parameters by combining the first set of values and the third set of values.

45. A non-transitory computer-readable medium storing code for wireless communications by a first user equipment (UE), the code comprising instructions executable by one or more processors to:
   receive, from a second UE, a second set of values for one or more radar measurement parameters associated with a radar target, a third identifier associated with the second UE and an indication of a second time value; and transmit a first report comprising a first set of values for the one or more radar measurement parameters associated with the radar target, an indication of a first time value associated with the first set of values, the second set of values for the one or more radar measurement parameters associated with the radar target, the indication of the second time value associated with the second set of values, a first identifier associated with the radar target, a second identifier associated with the first UE, and the third identifier associated with the second UE.

46. The non-transitory computer-readable medium of claim 45, the code further comprising instructions executable by the one or more processors to:
   determine a combined set of values for the one or more radar measurement parameters by combining the first set of values and the second set of values; and
   generate the first report comprising the combined set of values, the indication of the first time value associated with the first set of values, the indication of the second time value associated with the second set of values, the first identifier associated with the radar target, the second identifier associated with the first UE, and the third identifier associated with the second UE.

47. The non-transitory computer-readable medium of claim 45, the code further comprising instructions executable by the one or more processors to:
   receive, from the second UE, a third set of values for the one or more radar measurement parameters associated with the radar target, the third identifier associated with the second UE, and an indication of a third time value;
   determine that the second time value is earlier than the third time value; and
   generate, based at least in part on determining that the second time value is earlier than the third time value, a combined set of values for the one or more radar measurement parameters by combining the first set of values and the third set of values.

* * * * *